(12) United States Patent
Collins

(10) Patent No.: US 12,246,359 B2
(45) Date of Patent: Mar. 11, 2025

(54) DEVICE, SYSTEM, AND/OR METHOD OF A PLANT TREATMENT

(71) Applicant: GOHA, Inc., San Francisco, CA (US)

(72) Inventor: Kieran Collins, San Francisco, CA (US)

(73) Assignee: GOHA, INC.

( * ) Notice: Subject to any disclaimer, the term of this patent is extended or adjusted under 35 U.S.C. 154(b) by 0 days.

(21) Appl. No.: 18/230,304

(22) Filed: Aug. 4, 2023

(65) Prior Publication Data

US 2024/0157406 A1    May 16, 2024

Related U.S. Application Data

(60) Provisional application No. 63/383,491, filed on Nov. 12, 2022.

(51) Int. Cl.
| | | |
|---|---|---|
| *A01G 7/06* | (2006.01) |
| *B08B 1/14* | (2024.01) |
| *B08B 1/30* | (2024.01) |
| *B08B 3/08* | (2006.01) |

(52) U.S. Cl.
CPC ............... *B08B 1/143* (2024.01); *A01G 7/06* (2013.01); *B08B 1/30* (2024.01); *B08B 3/08* (2013.01)

(58) Field of Classification Search
CPC ...... A01G 7/06; A45D 19/026; A45D 19/028; A47J 43/283
See application file for complete search history.

(56) References Cited

U.S. PATENT DOCUMENTS

| | | | | |
|---|---|---|---|---|
| 1,921,002 A | * | 8/1933 | Ozabal | A45D 24/46 15/160 |
| 2,055,314 A | * | 9/1936 | Seburger | G02C 13/006 401/206 |
| D154,595 S | * | 7/1949 | Franchi | D4/120 |
| 2,723,412 A | | 11/1955 | Harris | |
| 2,896,243 A | | 7/1959 | Schoenfield | |
| 3,075,223 A | | 1/1963 | Warner | |
| 4,126,962 A | * | 11/1978 | Polcaro | A47L 25/00 15/210.1 |
| 4,644,604 A | * | 2/1987 | Kierce | B05C 17/023 15/230.11 |
| 4,716,677 A | * | 1/1988 | Moore | A01M 21/043 47/1.5 |
| 5,249,389 A | * | 10/1993 | Gallo | A01H 1/027 47/1.41 |

(Continued)

OTHER PUBLICATIONS

Microfiber Plant Dusting Gloves https://bloomscape.com/product/dusting-gloves/.

(Continued)

*Primary Examiner* — Kristen C Hayes
(74) *Attorney, Agent, or Firm* — Peter Jensen-Haxel

(57) ABSTRACT

The present disclosure relates to a plant cleaning device that includes a handle, a pair of arms connected to form a handle, where each arm from the pair of arms further includes a rotating head including and/or able to receive a treatment surface, such as a sleeve. The head may be removable. The sleeve may be a double-sided cleaning sleeve covering the rotating head. The sleeve wipes a plant element, such as a leaf, to to clean, condition, and/or treat the plant element.

16 Claims, 16 Drawing Sheets

(56) References Cited

U.S. PATENT DOCUMENTS

| | | | | | |
|---|---|---|---|---|---|
| 5,988,910 | A | * | 11/1999 | Yahav | G02C 13/006 |
| | | | | | 206/5.1 |
| 7,716,677 | B2 | | 5/2010 | Simeonov | |
| 10,011,993 | B2 | * | 7/2018 | Grubbs | E04D 15/04 |
| 11,606,948 | B2 | * | 3/2023 | Rad | A01M 21/043 |
| 2012/0017500 | A1 | * | 1/2012 | Davis | A01G 7/06 |
| | | | | | 47/1.5 |

OTHER PUBLICATIONS

Bürstenhaus Redecker Plant Brush https://www.redecker.de/en/plant-brush-460135.

* cited by examiner

Treatment Process Flow 1250

Fig. 14  Treatment Data Process Flow 1450

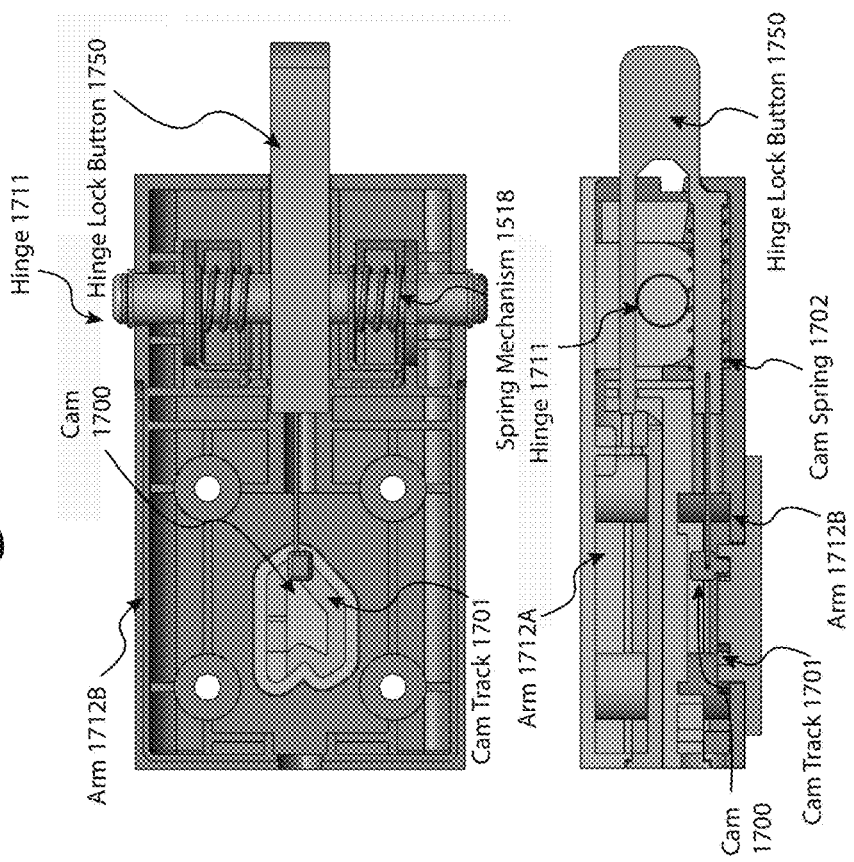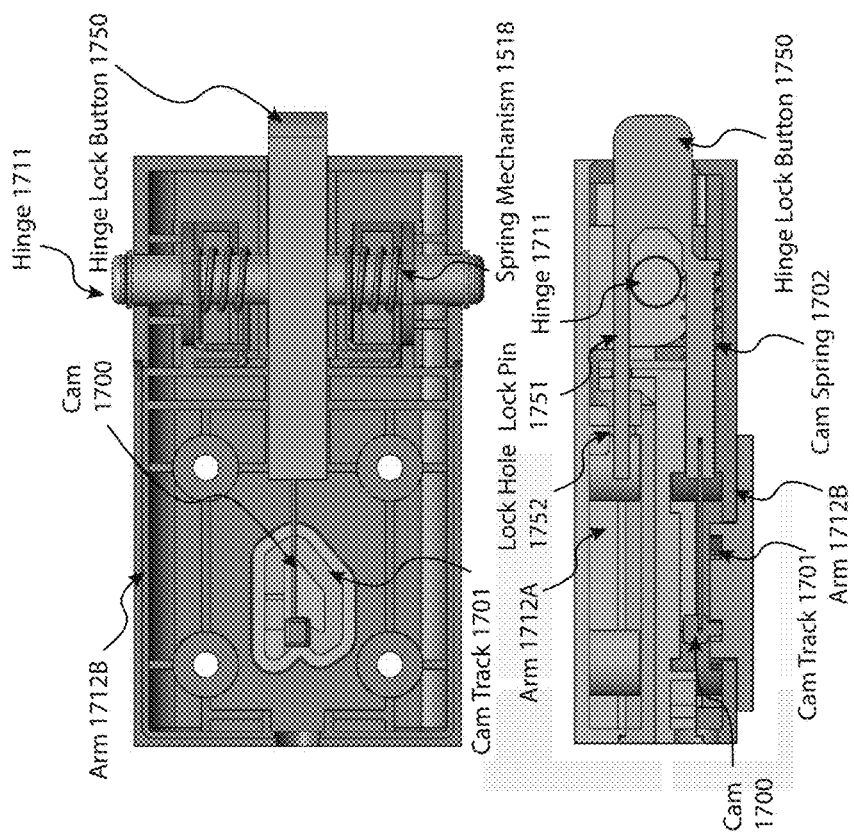

DEVICE, SYSTEM, AND/OR METHOD OF A PLANT TREATMENT

CROSS-REFERENCE TO RELATED APPLICATION

This application claims the benefit under 35 U.S.C. § 119(e) of U.S. Provisional Application No. 63/383,491, entitled "A handheld assembly for plants," filed Nov. 12, 2022, the entire contents of which are incorporated herein by reference.

FIELD OF INVENTION

This invention generally relates to a device, system, and/or method of plant treatment for cleaning, conditioning, detection conditions of, collecting data on, and/or treating plants.

BACKGROUND

Plants receive care from people in many contexts. In agriculture, plants may need to be monitored, cleaned, and/or treated to improve plant health, crop yields, prevent the spread of disease (e.g., especially within enclosed greenhouses and/or for a monoculture crop), and/or administer treatments (e.g., vitamins, plant hormones, anti-microbial compounds, pesticides, etc.). In a commercial setting, office buildings, restaurants, hotels, and/or other businesses within the hospitality industry may have tens, hundreds, or even thousands of indoor plants used as déor and atmospheric conditioning in landscaping, rooms, and common areas. In aeronautic space applications, plants may be important to provide food, oxygen, water purification, and other life support functions to astronauts. Similarly, laboratories and/or science facilities may wish to run controlled experiments in which consistent cleaning, data gathering, and/or treatment processes are ensured. And of course, there is also the simplest case of growing and maintaining common house plants in a residential setting, which occurs in many homes in the United States and around the world.

Just one example use case is cleaning dust, gathering data, and/or applying treatments to indoor plants, which includes commercial, agricultural, and/or household use. Indoor gardening is a long-practiced hobby, so it's no surprise to see houseplants continuing to surge in popularity. Indoor plants also have continued to be utilized by commercial businesses in both private and public areas. For many indoor plants, it is advantageous to clean or treat them for diseases, fungi and pest infestations to keep them healthy, which can also provide an opportunity to check for pests, as well as to make them more attractive. In an agricultural setting, indoor house plants often are inspected, treated, and sometimes cleaned.

Users may take an indoor plant outside or into a tub or a shower for cleaning; however, such a process is sometimes not an option, for example if there is no shower or a tub close to the location of the indoor plants, or the indoor plant is too large to move. Thus, people may have to clean leaves/plants manually with a duster, sponge, damp rag or disposable paper. Such cleaning with improvised tools and disposables may damage the plant and can result in unnecessary cost and waste. Such a process for cleaning can also be operationally inefficient. As a specific example, people can sometimes use a wet paper towel to clean leaves by taking a single leaf at a time with both hands to sandwich the leaf in between the towel paper for cleaning, which may break the leaves, not clean the leaves evenly, or damage the leaves. Additionally, using paper towels may be expensive, environmentally harmful, and cumbersome.

In home, commercial, scientific, and/or agricultural settings, using sponges or rags to clean plants or apply treatments may also be ineffective and may spread diseases and infestations (fungal/pests), which may not be visible via the human eye (e.g., microscopic bacterium or spores). Sponges or rags may require a user to use both hands to clean leaves. The process may be time intensive and can damage the plants as a user can leave more water on the plant, damp the leaves more than required, damage the delicate underlining of the leaves or break the leaves because of the pressure applied. This is especially true for plants with large amounts of small leaves or with leaves that grow upright, or plants with thin or delicate leaves. Sponges or rags must be either cleaned often during their use or replaced to prevent the transference of dirt, disease or infestation, resulting in more materials causing diseases being carried away by the user. In some contexts, preventing damage is especially important, for example with rare or expensive crops, and/or for plants in scientific research, space stations, or space colonies.

There is a continuing need for new solutions to efficiently clean, collect data, and/or apply treatments to plants in residential, commercial, agricultural, and even scientific settings.

DESCRIPTION OF THE PRIOR ART

There are several issued patents related to dusting and cleaning devices. While acceptable for cleaning some plants, they may have one or more disadvantages.

U.S. Pat. No. 4,126,962, entitled "Plant care device" describes a plant care device for cleaning and/or applying fluids to the leaves of decorative foliage plants, including a pair of opposed inwardly flexible arms connected at one end. The other ends of the arms are each provided with an enlarged, generally flat-headed portion, in turn receiving at each inner surface thereof a fluid absorbable pad. The pads adapted to close upon each other in a closed position.

U.S. Pat. No. 2,723,412, entitled "Cleaning device (Venetian blinds)", describes a cleaning device utilized for cleaning operations. The device consists of two independent sections, which, when used as an assembly, are particularly suitable for cleaning slats, such as Venetian blinds, and when used independently, are particularly suitable for cleaning flat surface areas, such as windows, windshields and the like.

U.S. Pat. No. 2,896,243, entitled "Venetian blind slat-cleaning device", describes a device for cleaning slats of a Venetian blind without dismounting the blind from its support at a window. The device consists of wiping elements which are normally flat and fixed on the frame, and the other in the form of a roller which is rotatable on the frame and of convex curvature of the underside of the transversely curved slat to have complete contact and remove dust when the roller is rolled lengthwise beneath the slat.

U.S. Pat. No. 3,075,223, entitled "Appliance for cleaning the surfaces of relatively thin articles, such as the slats of Venetian blinds", describes an appliance for cleaning the surfaces of relatively thin articles consisting of a first pad of a sponge material on a first curved plate and a second pad of a sponge material carried on a second curved plate for cleaning both surfaces of the article to be cleaned.

U.S. Pat. No. 4,716,677, entitled "Manual devices and methods for selective application of chemical substances to plants" describes a hand-held chemical applicator for applying chemicals to selected plants while surrounding plants are shielded from accidental contact. A pair of pads are mounted to the opposing surfaces of the distal portions of pincers or tongs to define an absorbent pad carrying a solvent. In an alternative, a single applicator pad is mounted to a holder is shielded by a resilient flat strip which is deflected by the selected plant to open up an application zone. The hand-held applicator is also useful for cleaning artificial plants. U.S. Application No. 2012/0017500, entitled "Indoor Plant duster and solution applicator", describes a device for cleaning and applying a solution to the leaves of a plant. The device comprises a pair of tongs equipped with permanent sponge pads along the inner portion of each tong leg. The tongs are used to grasp an elongated leaf and run along its length to clean and remove dust from them using a dry sleeve.

SUMMARY

In various embodiments, the present disclosure provides a plant treatment device for cleaning plants (including fungi). In one embodiment, a plant treatment device includes a handle, the handle including a first arm and a second arm. The first arm and the second arm are joined at one end, forming the handle. A first head is coupled to the first arm, and a second head is coupled to the second arm. At least one of the first arm and the second arm include a rotational element rotationally coupling the head to the at least one of the first arm and the second arm. At least one of the first head and the second head are configured to receive a treatment surface for treating the plant.

The sleeve may be a double-sided cleaning sleeve pretreated with at least one of a chemical and a solution one or both sides of the sleeve. The first arm and the second arm may be connected via a spring. The spring may allow a user to control the movements of the plant treatment device. The plant treatment device further includes a pin, the pin secures the plant treatment device in a close position for storage. At least one of the first arm and the second arm may comprise an extendible arm. The head may rotate the treatment surface up to 360°, thereby placing one side of the sleeve on the portion of the plant at one time. At least one of the first arm, the second arm, the first head, and the second head may be removable. The treatment surface may be pretreated with a liquid, and the treatment surface may be a disposable sleeve. The treatment surface may be a sleeve covering the head. The plant treatment device may also include a head that may be convex-shaped.

In another embodiment, a device for treating plants includes a handle, the handle comprising a first arm and a second arm wherein the first arm and the second arm are joined at one end to form the handle. The device also includes a first head coupled to the first arm and a second head coupled to the second arm.
The first arm and/or the second arm include a rotational element rotationally coupling the head to the at least one of the first arm and the second arm. At least one of the first head and the second head are configured to receive a treatment surface for treating the plant. A locking mechanism holds the first arm and the second arm in at least one of an open position and a closed position when the locking mechanism is engaged. The treatment surface includes a sleeve pretreated with at least one of a chemical and a solution.

In yet another embodiment, a method of using a handheld device for cleaning a plant includes placing a sleeve on each arm of a pair of arms of the handheld device; and disengaging a locking mechanism from the handheld device to open the handheld device. Each arm of the pair of the arms moves away from the other to place the handheld device in an open position. The method then positions the pair of arms in an open position over a leaf of the plant such that the leaf is placed in between the pair of arms. Pressure is applied on the handle to close the pair of arms such that a first surface of the sleeve touches a top surface and a bottom surface of the leaf.

The method slides the first surface of the sleeve from one end of the leaf to another end of the leaf, wherein the first surface of the sleeve cleans the top surface and bottom surface of the leaf. The method rotates a head of the handheld device up to 360°, the rotation switching the first surface of the sleeve with a second surface of the sleeve. The method then slides the second surface of the sleeve from one end of the leaf to another end of the leaf. The second surface of the sleeve cleans the top and bottom of the leaf with a liquid.

BRIEF DESCRIPTION OF THE DRAWINGS

The accompanying drawings, where like reference numerals refer to embodiments, together with the detailed description below, are incorporated in and form part of the specification and serve to illustrate further embodiments of concepts that include the claimed disclosure and explain various principles and advantages of those embodiments.

The assembly and methods disclosed herein have been represented where appropriate by conventional symbols in the photographs, or drawings, showing only those specific details that are pertinent to understanding the embodiments of the present disclosure so as not to convolute the disclosure with details that will be readily apparent to those of ordinary skill in the art having the benefit of the description herein.

FIG. 17A illustrates an example of a hinge lock mechanism in an engaged position from a top section view, according to one or more embodiments.

FIG. 17B illustrates an example of a hinge lock mechanism in an engaged position from a side section view, according to one or more embodiments.

FIG. 18A illustrates an example of a hinge lock mechanism in a disengaged position from a top section view, according to one or more embodiments.

FIG. 18B illustrates an example of a hinge lock mechanism in a disengaged position from a side section view, according to one or more embodiments.

DETAILED DESCRIPTION

While the presently disclosed assembly and methods are susceptible of embodiment in many different forms, there is shown in the figures and will herein be described in detail several specific embodiments with the understanding that the present disclosure is to be considered as an exemplification of the principles of the present technology and is not intended to limit the technology to the embodiments illustrated.

The present disclosure provides a solution to overcome issues of safely cleaning, gathering data, conditioning and/or treating plants, artificial plants, and fungi without damage, in one or more embodiments. The present disclosure provides a handheld device for cleaning plants, the disclosed assembly can simultaneously clean and apply fluids to one or both sides of the plant leaf. The disclosed plant treatment device can apply fluids, including, but not limited to, water, gels, oils, chemicals, pesticides, fertilizers, leaf gloss materials, leaf protectants, materials and the like, which may be natural or synthetic in composition. The plant treatment device can also apply powders and other granularized solids.

Figure 1:
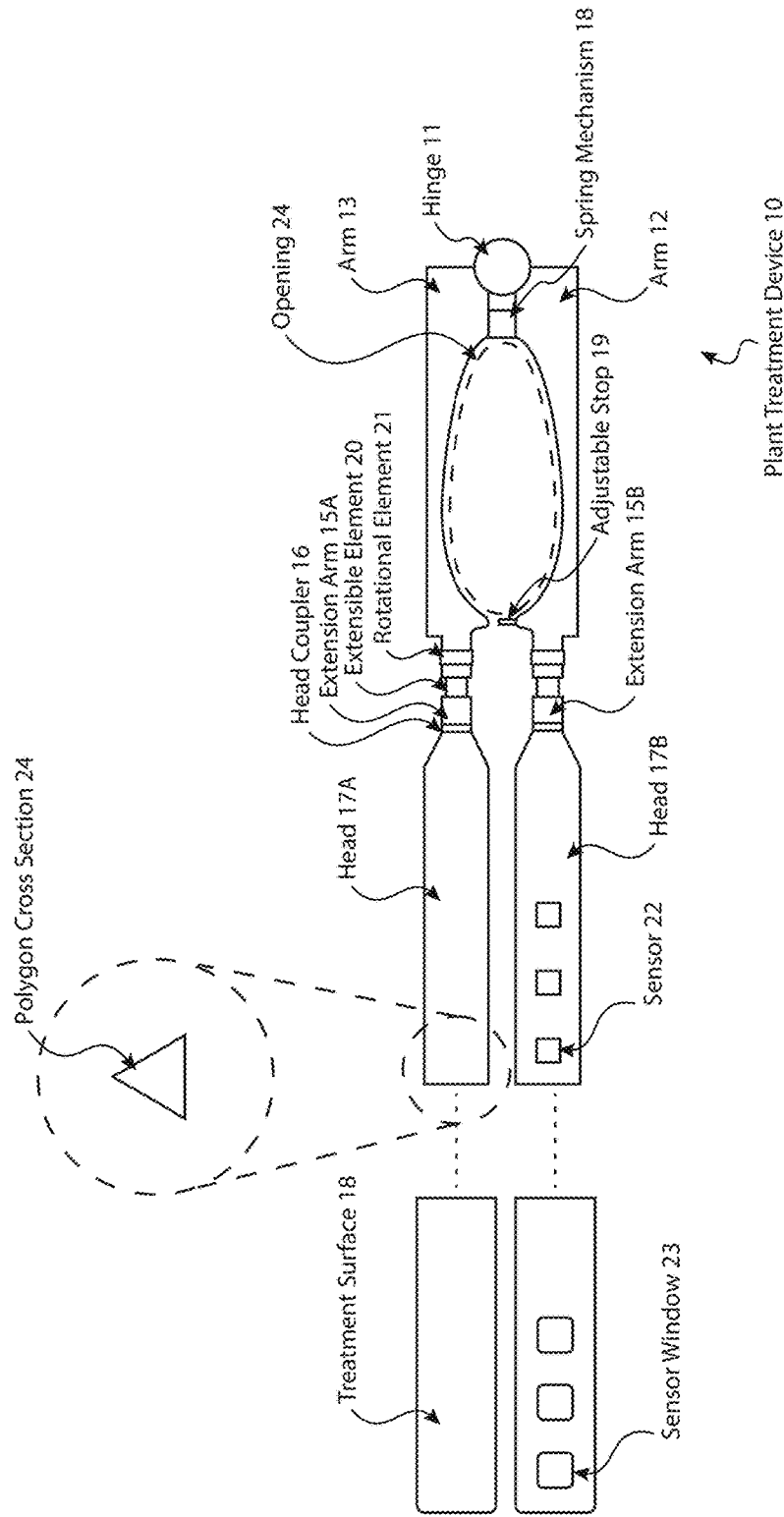
FIG. 1 illustrates a plant treatment device usable to clean, apply treatments, gather data, and/or sense conditions of a plant, according to one or more embodiments.

FIG. 1 illustrates a plant treatment device 10, according to one or more embodiments. In one or more embodiments, a plant treatment device 10 may include a hinge 11 coupled to a first arm 12A and a second arm 12B. The arm 12A and the arm 12B may together form a handle that when the hinge 11 is closed and/or partially open (including any mechanical constraint on the limitation of its opening or closing) may be comfortable for holding and/or manipulation by a human hand. The arm 12B and the arm 12A each may be coupled to an instance of the extension arm 15 (e.g., the extension arm 15A and the extension arm 15B, respectively). The extension arm 15 may include and/or may be coupled to, in one or more embodiments, a head 17 that may act as a tool for cleaning, gathering data, and/or treating plants, alone or in combination with one or more treatment surfaces 18. The head 17 may include, in one or more embodiments, an extensible element 20 allow for extension of the head 17 and/or a rotation element 21 allowing for free or constrained (e.g., lockable, ratchet) rotation of the head 17, for example around an exist co-parallel with a length of the arm 12B and/or the arm 12A. Although not labeled, a first head may be referred to as the head 17A, and the second head may be referred to as the head 17B.

In one or more embodiments, the head 17 may be attached to the extension arm through a coupler 16. The coupler 16 may allow for removability and/or replaceability of the head, including for repair, replacement, and/or to select different types of heads or tools. The coupler 16 may be any suitable coupler, for example a quick connect coupler, a friction fitting peg fitting into a recess, a threaded coupler, concentric elements of the head 17 and the extension arm 15, a depressible button one of the head 17 and the extension arm 15 and a hole in the other of the head 17 and the extension arm 15 for receiving the depressible button to lock the head 17 in place, etc.

In one or more embodiments, the head 17A and/or the head 17B may be able to be removed and/or replaced through a coupling element that mechanically couples the head 17A to the arm 12B and/or the head 17B to the arm 12A. The coupling element may be, for example, a quick-connect coupler with ball-bearings, a friction fit coupler, spring-loaded teeth or latches fitting into depressions, detent pins fitting into holes or other depressions, bolts and/or pins placed through through-holes in both the head 17A and/or the arm 12B and/or the head 17B and/or the arm 12A, etc.

In one or more embodiments, a user may grip a leaf and/or other plant element between each instance of the head 17 and let the leaf and/or other plant element move between the two instances of the head 17 while pressure is maintained to clean, dust, and/or apply a treatment to the plant. Alternatively, or in addition, the user may also utilize a data gathering and/or plant diagnosis feature, according to one or more embodiments, and as further described below. The user may also use the exterior of the head 17 (a "non-grip side") to brush or dust a plant or plant element.

The extensible element 20 may be useful, for example, to enable longer tool fitting attachments on the head 17, to reach high, deep, or other hand-to-get places on plants (e.g., tree branches, high palm fronds), to create a larger cleaning surface (e.g., for broad leaves, branches, and/or surfaces), and/or other reasons for plant cleaning as will be evident to one skilled in the art. The rotational element 21 may be useful, for example, to change a treatment surface which is "active" between each instance of the head 17, and/or to allow one or both instances of the head 17 (e.g., the head 17A and the head 17B) to rotate freely to held follow the contour of a leaf or other element.

Each head 17 may be able to directly clean, treat, and/or collect data on a plant and/or plant element. However, in one or more embodiments, a treatment surface 18 may be adhered and/or coupled to one or both instances of the heads 17, as further shown and described in the embodiment of FIG. 2A through FIG. 2C. The treatment surface, for example, may be a cloth made of natural and/or synthetic polymers, fibers, and/or microfibers, for example cotton, hemp, bamboo, Tencel®, wool, nylon, and/or polyester. The natural and/or synthetic polymers may include anti-microbial properties (e.g., silver coatings, antibiotics, essential oils). In one or more other embodiments, the treatment surface may include a brush, bristles, and/or abrasives of various coarseness. In one or more embodiments, the treatment surface 18 may even include scarification elements which may be useful for applying certain types of plant treatments and/or stimulating growth by emulating natural damage processes in a controlled way, which may be especially useful for certain crops and/or for scientific research.

Figure 2A:
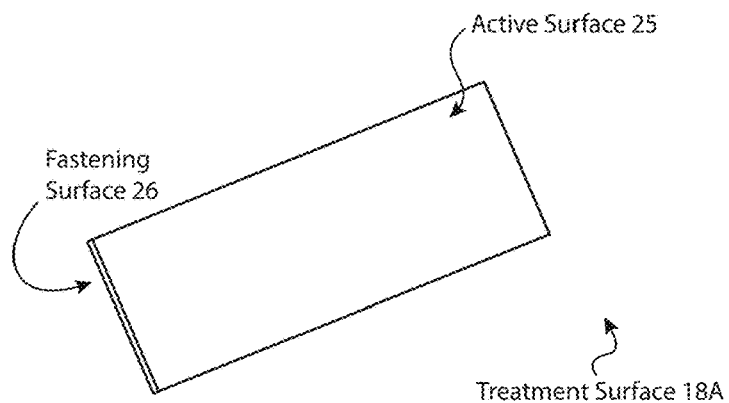
FIG. 2A illustrates an example of a treatment surface that may be coupled to the plant treatment device of FIG. 1, according to one or more embodiments.
Figure 2B:
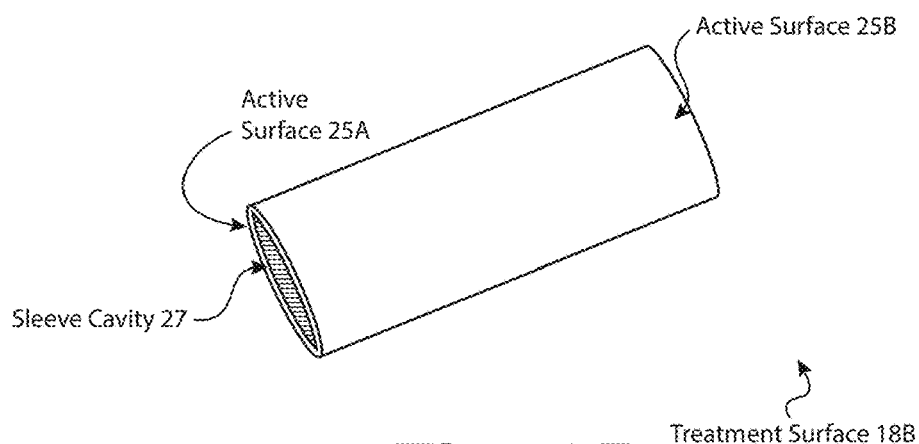
FIG. 2B illustrates another example of a treatment surface that may be coupled to the plant treatment device of FIG. 1, according to one or more embodiments.
Figure 2C:
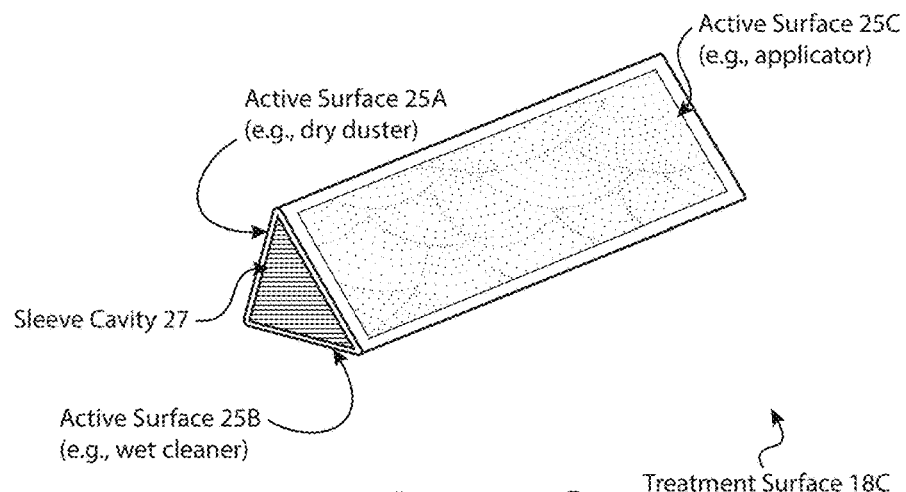
FIG. 2C illustrates yet another example of a treatment surface that may be coupled to the plant treatment device of FIG. 1, according to one or more embodiments.

In one or more embodiments, and as further illustrated in FIG. 2A through FIG. 2C, each head 17 may have a polygonal cross section 24, for example a triangle, a square, a pentagon, a hexagon, etc. The polygonal cross section 24, for example, may permit additional cleaning surfaces that can be "refreshed" by turning the head 17 with the rotational element 21. Alternatively, or in addition, different cleaning capabilities, sensing capabilities, and/or treatment capabilities may be present on different active surfaces (e.g., the active surfaces 25 of FIG. 2A through FIG. 2C).

In one or more embodiments, the plant treatment device 10 may include one or more sensors 22, for example infrared sensors, spectrometers, imaging sensors, cameras, and/or chemical sensors. In one or more embodiments, one or more sensors 22 may be integrated into one or both of the heads 17. For example, when the user grips a leaf or other plant element for cleaning, the sensor 22 that includes a spectrometer may gather data on the color of the leaf or other plant element, including for example during the entire time the plant is gripped. The treatment surface 18 may include one or more sensor windows 23 if an unobstructed view of the plant is needed for the sensor 22 to effectively work.

In one or more embodiments, the plant treatment device 10 may include a spring mechanism 18 which may apply force such that the arm 12B and the arm 12A are brought together and/or pushed apart in a resting state. The spring mechanism 18 may be a torsion spring, a coil spring, a leaf spring, an electromagnet, an elastic polymer band, and/or other suitable element or elements having a spring constant and mechanically coupling the arm 12A and the arm 12B. The spring mechanism may include one or more elements having a spring constant. Although illustrated in FIG. 1 at a hinge-end of the handle, the spring mechanism 18 may be located at any suitable location, including an opposite end of the handle, for example one or more elastic elements mechanically coupling the arm 12B and the arm 12A. In one or more other embodiments, and as further described in conjunction with the embodiment of FIG. 4A through FIG. 11, the spring mechanism 18 may be a coil spring, torsion spring, and/or a set of torsion springs integrated into and/or working in conjunction with the hinge 11.

In one or more embodiments, the hinge 11 may be able to be locked open or closed by a locking mechanism. For example, locking the hinge 11 in a closed configuration may asset with storage and/or stowing of the plant treatment device 10 in a storage container, storage bag, and/or a tool belt. Many configurations of the locking mechanism are possible. In one or more embodiments, the locking mechanism may be a switch located on the arm 12B that may engage a hook that may catch on the opposite arm 12A. The switch may naturally be positioned in a location such that when the user holds the handle their thumb rests on or near the switch. In another embodiment, the locking mechanism may be a collar that slides over the arm 12A and the arm 12B, preventing further opening of the head 17A and the head 17B.

In another embodiment, the locking mechanism may be a push-button located on or near the hinge 11 which when depressed locks the hinge 11 in an open and/or closed configuration. For example, the push-button may be spring-assisted cam or thrust device (e.g., similar to a click action retractable pen) that may engage a rod and/or pin that enters one or more through-holes of the hinge 11 such that the hinge 11 cannot rotate until the rod and/or pin is withdrawn by another depression of the push-button. The push-button may similarly be push-push latch with a cam path that guides a pin around the cam path to be locked in one of two or more locations (e.g., depressed, relaxed), a push-button with a pin zig-lag, and/or a push-button with a ball zig-lag.

In one or more embodiments, the plant treatment device 10 may include an adjustable stop 19 which may prevent each instance of the head 17 from closing too far and/or too much pressure being placed on the leaf or other plant element when gripped between both instances of the head 17. In one or more embodiments, the adjustable stop 19 may be a hard stop element such that the heads 17 cannot finish closing, and may be set at a variable distance which the user may select depending on cleaning, data gathering, and/or treating goals. In one or more embodiments, the adjustable stop 19 may include a resistive element, for example a spring or depressible material (e.g., foam) to increase resistance of each head 17 to closing and/or increase a force required for each head 17 to close. Although illustrated at one end of the handle, the adjustable stop may be located in any suitable location, for example on the ends of the heads 17, near the hinge 11, and/or in other locations.

In one or more embodiments, the plant treatment device 10 may include an opening 24 formed between the arm 12A and the arm hand 13. The opening 24 may be useful to eliminate "pinch points" that may otherwise trap or damage leaves or other plant elements. Another example of the opening is shown and described in conjunction with the embodiment of FIG. 11. This may be especially useful when cleaning deep and/or interior leaves, where closing the plant treatment device 10 to clean a set of leaves farther from the user may otherwise trap, catch, and/or pinch a closer set of leaves between the arm 12A and the arm 12B. In one or more embodiments, the arm 12A and the arm 12B may also include lighting elements (e.g., LED lights, ultraviolet LED lights), such that a user may be able to look through the opening to detect plant condition and/or damage in an otherwise dark or difficult to see location.

Figure 13:
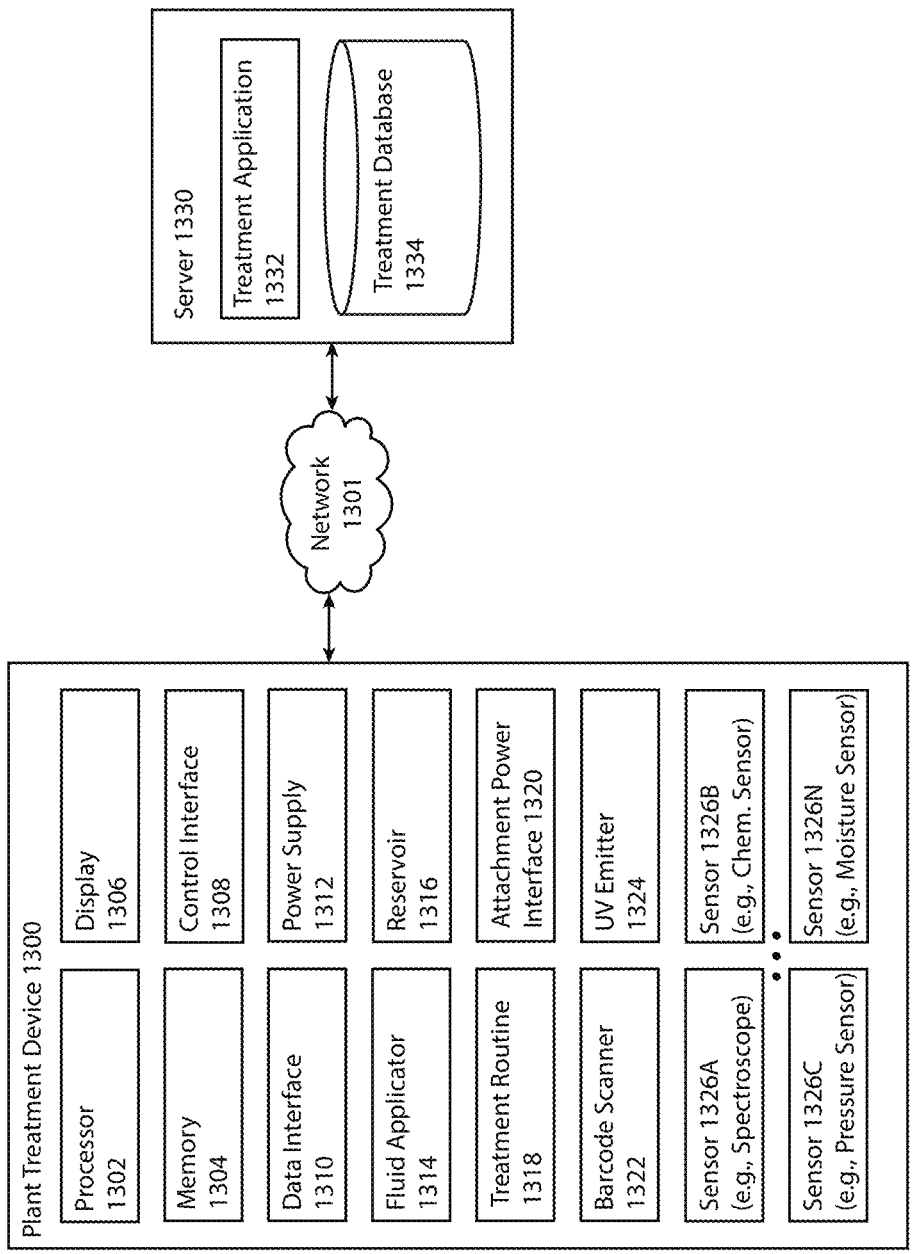
FIG. 13 illustrates an example embodiment of the plant treatment device of FIG. 1 including a processing capability, one or more sensors, and/or a treatment routine that may include computer executable instructions, according to one or more embodiments.

In one or more embodiments, and as also further shown and described in conjunction with FIG. 13, electronics may be integrated into the plant treatment device 10, for example inside the arm 12B and/or the arm handle 14, including for example computing hardware and software for utilizing the sensors 22 and/or processing or transmitting data therefrom. Similarly, the plant treatment device 10 may include a power supply such as a battery and/or external power source. In one or more embodiments, and as also further shown and described in conjunction with FIG. 13, one or more reservoirs for liquid, gel, powder, and/or other substances utilized in plant treatment may be incorporated into the plant treatment device 10, for example inside the arm 12B and/or the arm handle 14. A spray of liquid or other substance may be conveyed down the extension arm 15A and/or the extension arm 15B and out holes and/or nozzles in one or both instances of the head 17, according to one or more embodiments (not shown in FIG. 1). In one or more embodiments, the head 17 may include a power interface (e.g., the attachment power interface 1320 of FIG. 13) to power a tool or other attachment (e.g., a sleeve 108 with a UV light).

Although some instances of the plant treatment device 10 and various embodiments thereof are described herein as "handheld", it will be understand that the plant treatment device 10 may be conveyed, wielded, and/or utilized by various non-handheld modalities. For example, the plant treatment device 10 can be adapted to and/or attached to a pole arm or other extension, where the hinge 11 can be mechanically actuated. Alternatively, or in addition, in one or more embodiments, the plant treatment device 10 may be adapted to a robotic hand and/or to fit on a robotic arm including automatic actuation of the hinge 11. The robotic arm may be the robotic arm of an autonomous cleaning or maintenance vehicle.

FIG. 2A through FIG. 2C illustrate examples of the treatment surface 18, according to one or more embodiments. The treatment surface 18 may be configured to be reusable, removable, cleanable, and/or disposable, which may depend on the application to which it is intended to be utilized. In one or more preferred embodiments, the treatment surface 18 is easy and fast for the user to change.

FIG. 2A illustrates a treatment surface 18A that may be a substantially flat rigid, soft (e.g., foam, silicone, rubber) and/or flexible surface that may be applied to one or both heads 17. The treatment surface 18A may include an active surface 25 for cleaning, applying a treatment, and/or data sensing, and a fastening surface 26 for fastening to the head 17. The active surface 25 may be, for example, a cloth, a polymer surface, a brush, bristles, an abrasive surface, a sponge, and/or another suitable material that is natural or synthetic in composition. The active surface 25 may be added to a ridged and/or flexible backing, or may be directly applied to the head 17. The fastening surface 26 may include, for example, hooks, cleats or loops of a hook-and-loop surface (e.g., Velcro®), a high-friction surface (e.g., silicone or rubber over-mold), temporary glue (e.g., rubber cement), snaps, push-tabs with teeth-like catches for cloth or sponge, string, clip, mounting hooks for brackets that may be incorporated in the head 17, and/or other suitable elements that will be recognized to one skilled in the art.

In one or more embodiments, the head 17A and/or the head 17B may be pulled away from the handle (e.g., via the extensible element 20), where the extensible element 20 may be spring loaded with a resting position in the retracted state. A extension lock may lock the heads 17 in place, while tensioning the one or more springs. The head 17A and/or the head 17B may automatically retract when the extension lock is unlocked. The head 17A and/or the head 17B may lock into place in the fully retracted position, for example through a retraction lock such as a hook, tab, and/or detent pin fitting into a groove, collar, and/or hole.

FIG. 2B illustrates a treatment surface 25B, according to one or more embodiments. In one or more embodiments, a treatment surface 25A may permit a first surface for cleaning, treatment, and/or data gathering, and a treatment surface 25B permitting a second surface for cleaning, treatment, and/or data gathering. The surface 25A and the surface 25B may be the same material and/or type of material, or different types of material. A sleeve cavity 27 may permit the treatment surface 18B to be placed over the head 17, which may be secured through a friction-fit and/or any of the other methods shown and descried in conjunction with FIG. 18A.

FIG. 2C illustrates a treatment surface 18C, according to one or more embodiments. The treatment surface 18C illustrates three actives surfaces 25. As just one example, the active surface 25A may be for providing a dry cleaning (e.g., a dry duster), the active surface 25B may be for then performing a wet cleaning on the same leaf or other plant element (e.g., a wet cleaner), and the active surface 25C may be for applying a treatment (e.g., cutin wax, zinc mineral treatment, *Bacillus thuringiensis*, leaf shining substance, a conditioning agent, etc.). The sleeve cavity 27 may fit a polygonal instance of the head 25 (e.g., conform to the polygon cross section 24). However, in one or more embodiments, the active surface 25B may also be a cylinder of flexible material without a structured polygonal shape that may conform to the polygonal shape of the head 17 when installed.

In one or more embodiments, during use, a first type of active surface 25 may be selected on a first head 17 and a second type of active surface 25 on a second head 17. For example, certain plants may only need treatment on one side, or a physiology of the plant may require special treatment and/or care (e.g., ensuring certain chemicals do not get absorbed through the stoma on the underside of the leaf, ensuring photosynthesis in the palisades on the top side of the leaf is not blocked by an applied treatment).

Although the plant treatment device 10 is described for treating plants, it will be recognized by one skilled in the art that artificial plants may also be treated. For example, artificial plants have similar shape and structure to real plants in order to increase realis, but be prone to building up dust. In one or more embodiments, certain stances of the treatment surface 18 may have one active surface 25 intended for treating plants, and one active surface 25 intended for treating artificial plants. This may especially be useful in commercial environments where décor may be a mix of both real and artificial plants.

In one or more embodiments, the treatment surface 18 may be reusable. For example, the treatment surface may be washable (e.g., by hand, in a washing machine), and/or able to be disinfected for future use (e.g., with solution made from diluted alcohol, soap, neem oil, or vinegar, and/or with UV light). This may further reduce waste and increase efficiency.

Several specific embodiments of the plant treatment device 10 will now be described in the embodiments of FIG. 3 through FIG. 11.

Figure 3:
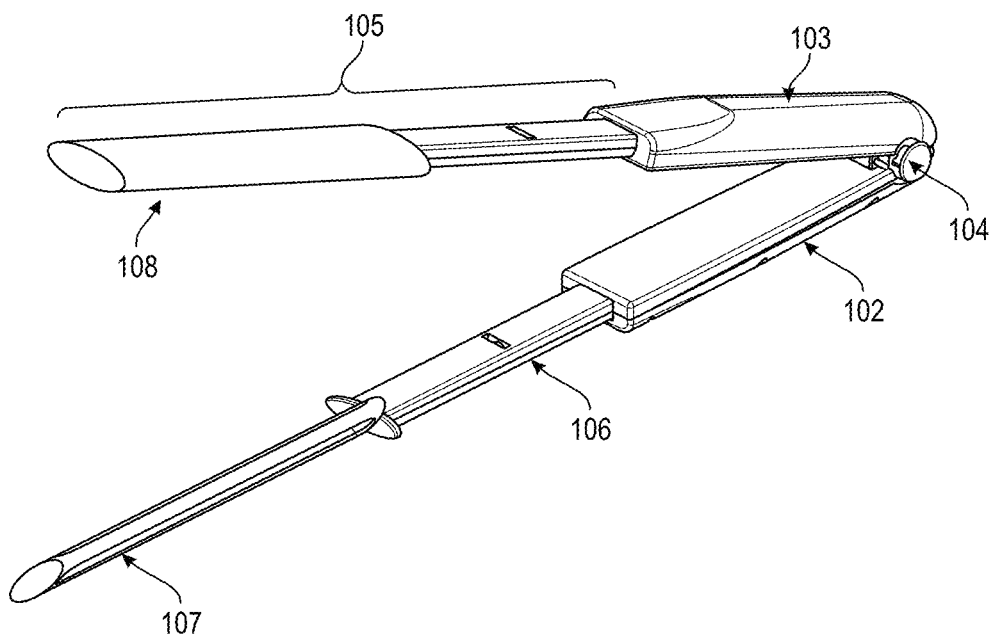
FIG. 3 illustrates in example embodiment of the plant treatment device that is a handheld device, according to one or more embodiments.

FIG. 3 illustrates a handheld device for cleaning and/or treating plants that is an example of the plant treatment device of FIG. 1, according to one or more embodiments. As shown in FIG. 3, the handheld device comprises a handle 104 including a first side arm 102 (e.g., an instance of the arm 12A) and a second side arm 103 (e.g., an instance of the arm 12B) cojoined using a spring (e.g., an instance of the spring mechanism 18) such as coil spring, torsion spring mechanism or other known mechanisms to open or close the handheld device, wherein a user of the device 100 applies pressure on the spring through the handle 104 to open or close the disclosed assembly. The pressure may be applied manually, mechanically, electromechanically, and/or electronically. The handle 104 further comprises a pair of assembly arms 105 (e.g., an instance of the extension arm 15A and the extension arm 15B) coupled to the handle 104, wherein each assembly arm further comprises an extendible arm 106 (e.g., the extension arm 15A and the extension arm 15B each including an extensible element 20), extending the length of the device 100, the extendible arm is housed within the assembly arm such that the extendible arms may be pulled out from within the assembly arm extending the length of the handheld device. The assembly arms 105 may be flat surfaces providing a surface for the leaf or other plant element to sandwich and slide the leaf in between the assembly arms 105. The assembly arms 105 may employ an equal width structure from its working end through the handle 104 region.

Figure 4:
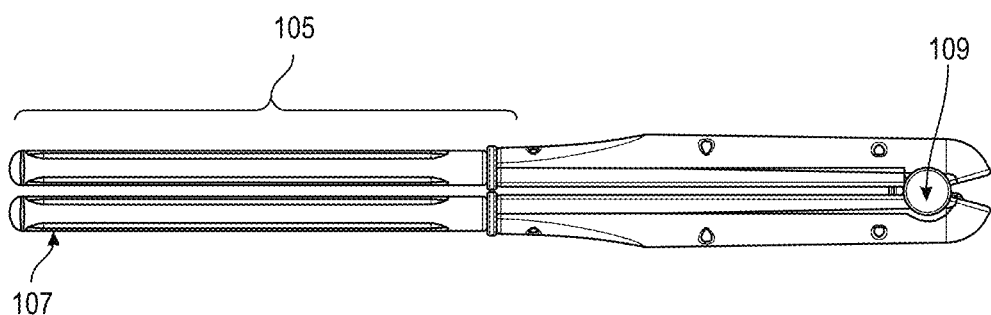
FIG. 4 illustrates a cross-sectional view of the handheld device of FIG. 3, showing a tool head present inside the assembly arm, according to one or more embodiments.

The handheld device further comprises a tool head 107, wherein the tool head 107 is a rotating tool head 107 which may be convex in shape with curved or rounded edges providing easy and/or smooth access to hard-to-reach places and decreasing manual pressure required to make contact with the leaf or leaves. FIG. 4 illustrates a cross-sectional view of the disclosed handheld device, showing tool head 107 is situated inside the assembly arm 105. The tool head 107 is round in shape, allowing for easy insertion of the assembly into the sleeve 108 (e.g., a treatment surface 18 comprising a sleeve cavity 27). The handheld device may further comprise a pivot pin 109 located within the handle 104, wherein a user may open the handheld device by pushing the pivot pin 109 away from the handle 104 or close the handheld device by pushing the pivot pin 109 towards the handheld device. In many embodiments, the pivot pin 109 further secures the handheld device in a close position for storage, making it handy for use, e.g., a user may carry the disclosed handheld device in a pocket, utility belt, and/or a small compact container rather than making a separate storing space. The disclosed assembly may also comprise a peg, a hook, a holder, a fastener, a clasp, a clip, eyelet, cord, strap or other such holding segment, the holding segment helps in opening and closing the assembly and/or storing the assembly while the assembly is not in use.

The handheld device may further comprise a hook located within the handle 104, wherein a user may open the handheld device by pulling the hook outwards or away from the handle 104 or close the handheld device by pushing the pivot pin 109 towards the handheld device.

The assembly may further comprise a sleeve 108 used to clean the plants. The sleeve 108 may be a removable sleeve 108, wherein one sleeve 108 may be put on each assembly arm, such as on the tool head 107 and/or extendible arm 106. Each sleeve 108 has at least two sides, including an interior side facing the assembly and an exterior side facing away from the assembly. The sleeve 108 may further comprise a textured side and a plain side, such as the textured side is used for cleaning the plants and the plain side is used for a different purpose, for example applying a chemical. The sleeve 108 may have one side of the sleeve 108 that may have a thicker texture than the other side of the sleeve 108 For example, the sleeve 108 may include one side that may be made of microfiber, and one side that may be a sponge. In one or more embodiments, the sleeve 108 may be made of cloth, sponge, microfiber, polyester, cotton, cotton fiber, microfiber, bamboo, hemp, cellulose, natural sponge, rubber, dry sponge, sea sponge, nylon polymers, wood pulp, natural fibers, linen and/or another soft material suitable for cleaning or applying solutions onto plant leaves. The sleeve 108 may be selected to clean the surface of a leaf without undue friction, abrasion or residue which may depend on the type of plant. The sleeve 108 may also be a dry sleeve 108 such that both sides of the sleeve 108 are dry, wherein the dry sleeve 108 may be used to remove dry material such as dust from the leaves. The sleeve 108 may also be a reusable sleeve 108 wherein the sleeve 108 can be cleaned, sterilized, and re-used or a single-use sleeve 108. The sleeve 108 may be coated with a chemical, conditioned with a solution, or pre-coated with a chemical, wherein the chemical may be any liquid used to clean plants, treat any plant disease or infection, or pretreat a plant to prevent disease or infestation. The chemical may be a cleaning solution. The sleeve 108 may also be soaked with water while cleaning plants with water. Leaves may also be sprayed with water, a solution or a chemical for treatment and the assembly is then applied with a dry sleeve 108 to wipe off the liquid. A separate cover may be put on the sleeve 108 wherein the cover may be used for cleaning, conditioning, or treating plants. The cover may be put on the sleeve 108 such that the cover moves along with the sleeve 108 while in use. The treatment surface 18 may have holes such that it can secure to a cleat or protrusion on the head 17 (i.e. button and button-hole mechanism), and/or may have a narrower or thinner base (e.g., a tapered shape) such that the treatment surface 18 fits securely while in use.

The sleeve 108 may secure over each assembly arm, such as over the tool head 107, such as when the sleeve 108 does not move or slide over the assembly arm while cleaning. The sleeve 108 and/or tool head 107 may comprise an anti-slide or gripping texture, such as when the sleeve 108 is put on each tool head, the sleeve 108 remains in place without slipping. The sleeve 108 may further comprise an elastic component at the base to hold the sleeve 108 over the assembly arm and prevent upward sliding when in use. In one or more embodiments, the sleeve 108 may include one or more holes such that it can be secured to a cleat, depressible element, depressible button, or other protrusion on the head 17. In one or more other embodiments, the sleeve 108 may be tapered and/or fit a tapered shape of the head 17 to assist in retention during use.

The assembly may further comprises a tool head 107 where the tool head 107 may be a rotating tool head 107. The tool head 107 may comprise a rotating means (e.g., the rotational element 21) rotating the tool head 107 up to 360°. The rotational ability may rotate the assembly arms 105 and the sleeve 108 on the assembly arms 105 up to 360° and expose one surface of the sleeve 108 at one time (e.g., one of the active surface 25A and the active surface 25B of FIG. 2B) for cleaning, conditioning, and/or treating. In one or more embodiments, the rotation may be implemented through an O-ring and an indexing plunger, spring ball plunger, and/or other element which allows the took head 107 to rotate into discrete secure configurations.

The rotating tool head 107 switches sides of the sleeve 108, such as switching the dry side of the sleeve 108 with a wet side, wherein a user may first use the dry side of the sleeve 108 over the surface of a leaf or a plant to remove dust or other dry material and then the rotating tool head 107 may be switched from the dry side to the damp side of the sleeve 108. For example, the damp side may be run over the surface of the leaf or the plant to apply a chemical over the leaf all without changing the sleeve 108, removing the sleeve 108, or manually changing the sides of the sleeve 108. The tool head 107 may be rotated electronically, manually, or mechanically.

Figure 5:
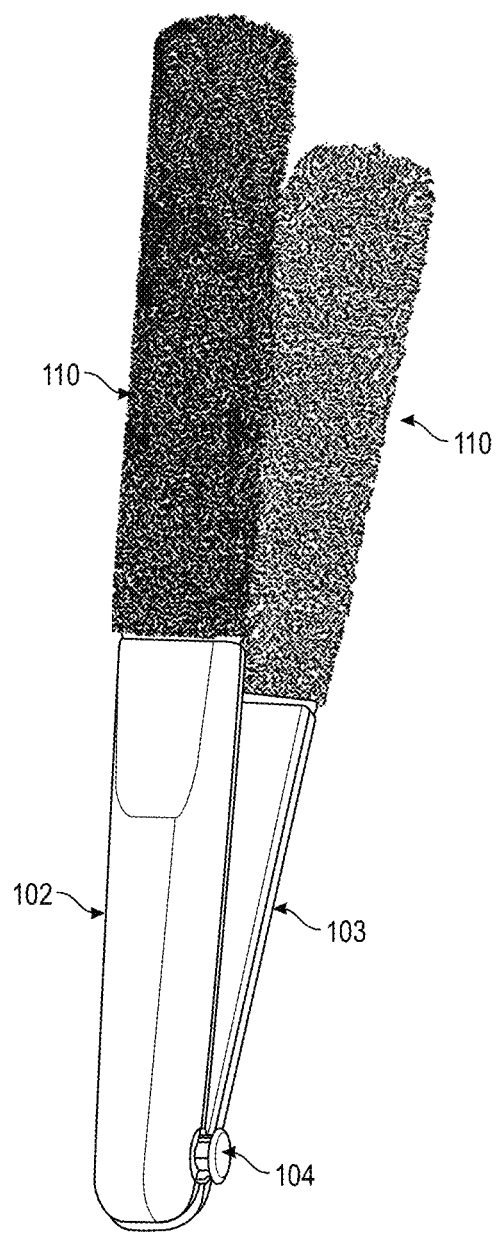
FIG. 5 illustrates a perspective view of the handheld device in an open position, according to one or more embodiments.

FIG. 5 illustrates a perspective view of the disclosed handheld device 100 in an open position. As shown in FIG. 5, the pivot pin 109 is pushed away from the handle 104, placing the assembly in an open position, with the handle 104 and assembly arms 105 moving away from each other. FIG. 5 further shows a sleeve 108 placed on each of the assembly arms 105 with a textured side facing the inside of the handheld device 100.

Figure 6:
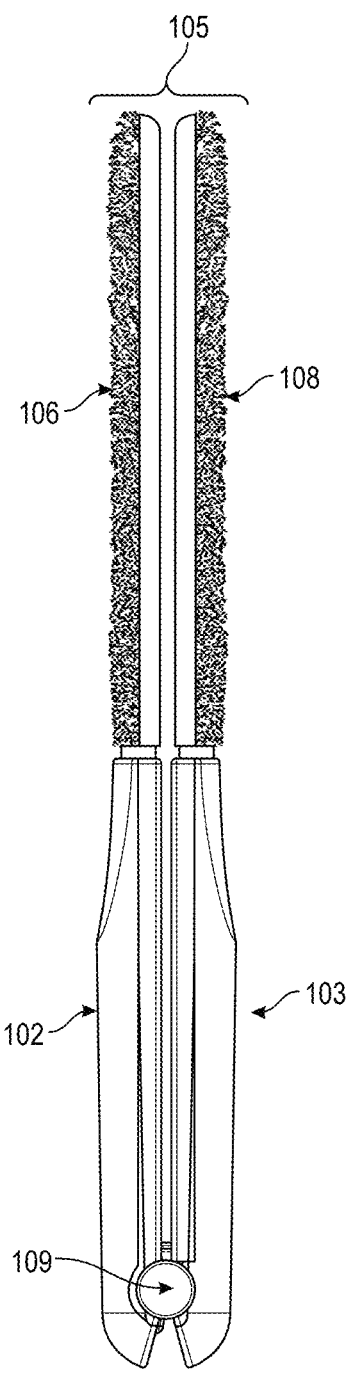
FIG. 6 illustrates a perspective view of the handheld device in a close position, according to one or more embodiments.

FIG. 6 illustrates a perspective view of the handheld device 100 in a closed position. As shown in FIG. 6, the pivot pin 109 is in lock position, placing the disclosed handheld device 100 in a closed position with a handle 104 and assembly arms 105 positioned in close proximity to each other. FIG. 6 further shows the sleeve 108 on each of the assembly arms 105, wherein a first surface of the sleeve 108 faces away from the assembly, and a second surface of the sleeve 108 faces inwards of the assembly. Either the first surface or the second surface may be textured, or both the first surface and the second surface is textured. As shown in FIG. 6, the textured surface is placed such that the textured surface is facing outside of the handheld device 100.

Figure 7:
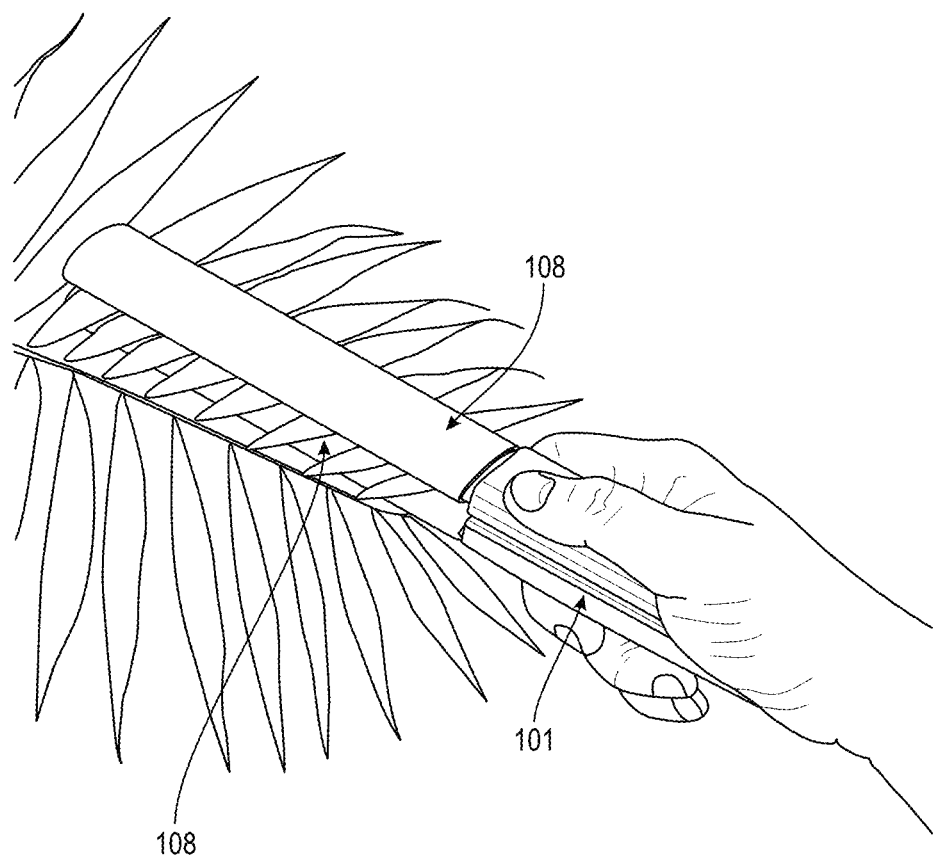
FIG. 7 illustrates an example embodiment of use of the plant treatment device, according to one or more embodiments.
Figure 8:
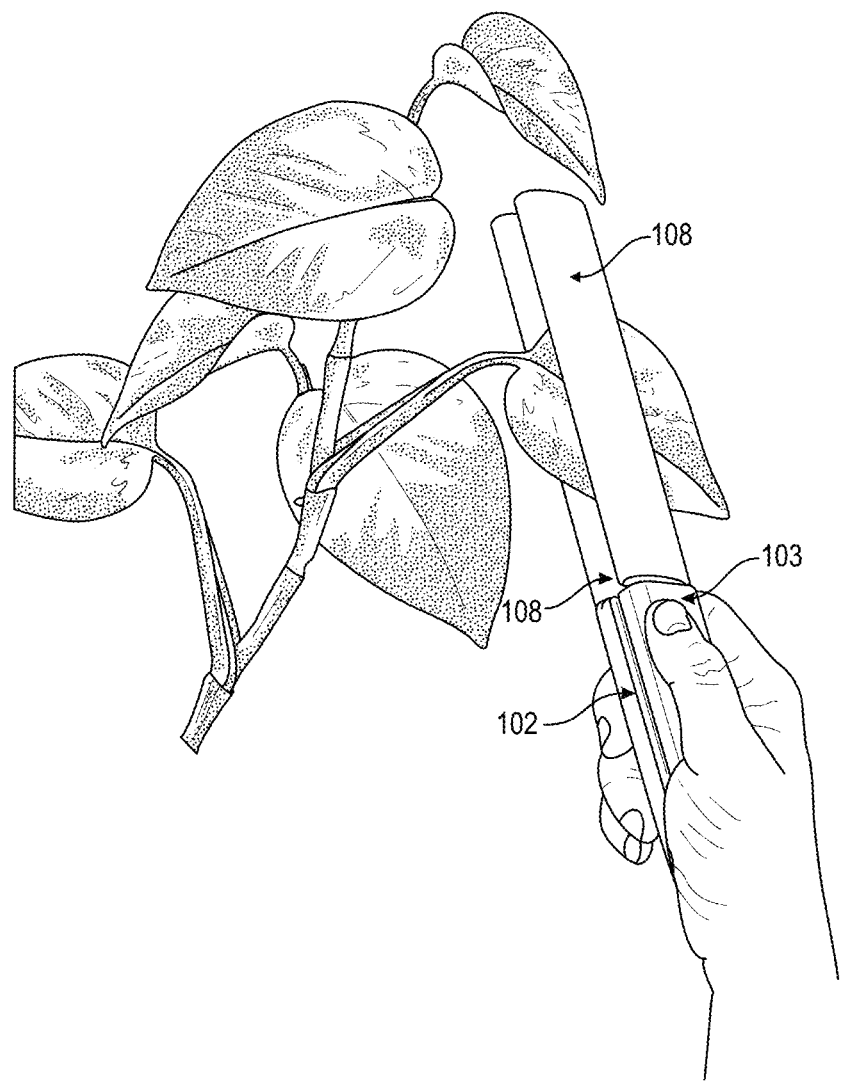
FIG. 8 illustrates an example embodiment of use of the plant treatment device.

FIG. 7 and FIG. 8 illustrate an example embodiment of the present invention. FIG. 7 and FIG. 8 show that a user operates the assembly via the handle 104 by applying pressure over the handle 104 to open and close the assembly arms 105. A user may apply pressure on both sides of the handle 104 for opening and closing the assembly via the spring system and slide the sleeve 108 over the leaves for cleaning, treating or conditioning the leaves.

The handheld device 100 can be used to clean a single leaf or plant element (e.g., the single flat leaf of FIG. 8) or multiple leaves and/or plants elements (e.g., the leaflets of extending from the pinnate leaf of FIG. 7) simultaneously. Therefore, the disclosed assembly can be used for plants with large leaves, plants with small leaves, plants with multiple small leaves making a big leaf, or any plant of various sizes and shapes.

Figure 9:
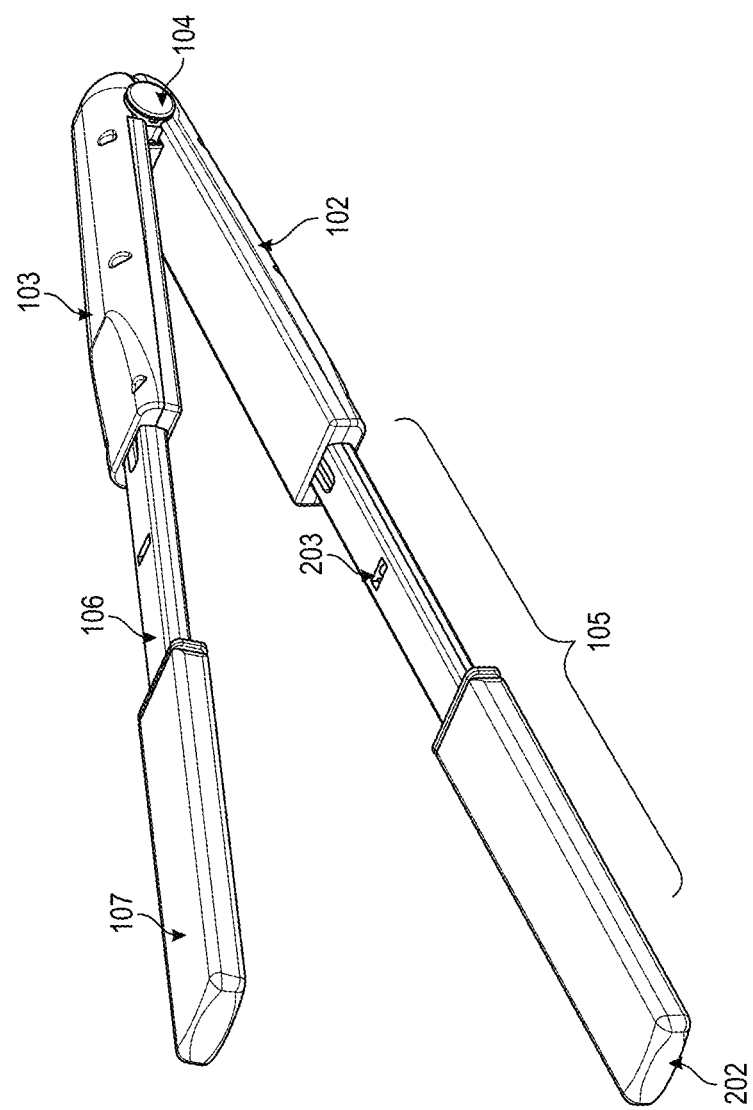
FIG. 9 illustrates an expanded view of the handheld device, according to one or more embodiments.
Figure 10:
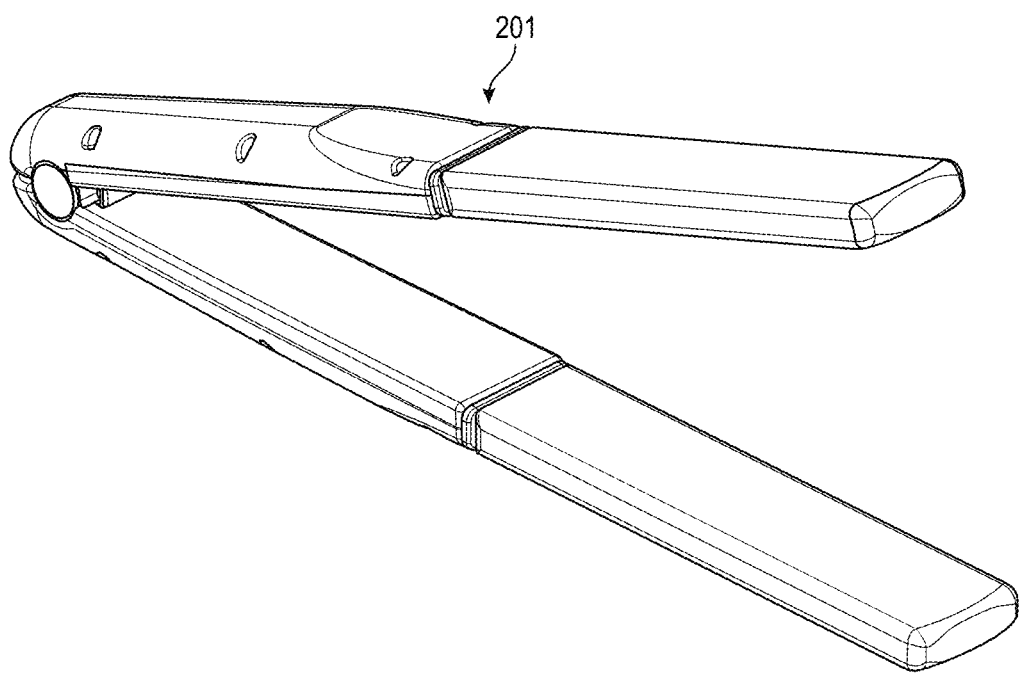
FIG. 10 illustrates an expanded view of the handheld device, according to one or more embodiments.

FIG. 9 and FIG. 10 illustrate an expanded view of the disclosed handheld device 100. As shown in FIG. 9, the assembly is shown in an open position with the pivot pin 109 pulled out from the handle 104 the assembly arm houses an extendible arm 106, wherein the extendible arm may be curled, nested, telescoped or wound within the assembly arm such that the extendible arm is not visible on the outside of the assembly arm (as shown in FIG. 10). The extendible arm may be pulled from one end of the assembly arm, the extendible arm extends the length of the disclosed handheld device 100. FIG. 10 further shows that the tool head 107 may be round, ovoid, and/or convex in shape making it easy for use and clean corners or hard to reach places in plants. FIG. 9 further shows that the tool head tip 202, visible from within the assembly arm, is round in shape. The round shape of the tool head 107 tip makes it easy for the tool head 107 to slip inside the sleeve 108. FIG. 2A further shows that the assembly arm moves up or down the assembly during its use. A user may move the assembly arm up and down to extend the length of the assembly, pull the extendible arm out from the assembly arm, or use the tool head 107.

The tool head 107 rotates up to 360° such that when the sleeve 108 is on the assembly arm, the sleeve 108 will move up to 360° along with the tool head 107 over the assembly arm. The handheld device 100 further comprises a hook 203 or a pin within the extendible arm to lock in the assembly arms 105 at a desired length once the extendible arms are pulled out, the locking will fix the length of the handheld device 100 and hold the extendible arm at a particular or desired position. The hook 203 may secure the extendible arm in an extended and/or standard position. Although one instance is shown, there are many ways to secure the extendable arm 106 at a particular and/or desired location in its extension.

In various embodiments, the disclosed handheld device 100 may also comprise a built-in spray bottle, the built-in spray bottle may be attached to the handle 104, wherein a user may use the assembly for removing dirt, dust, and other types of debris from the leaves of plants, preferably indoor plants together with spraying the leaves with a liquid by drawing out a liquid from the spray bottle onto the leaf directly or through the sleeve 108. The spray bottle may be integrated within the handle 104 or the spray bottle can be attached separately to the handle 104 of the device 100. The handle 104 may have a space, such as a hole to hold on to the spray bottle opening or an extension such that the extension can be pulled away from the handle 104 to attach a spray bottle to the extension.

Figure 11:
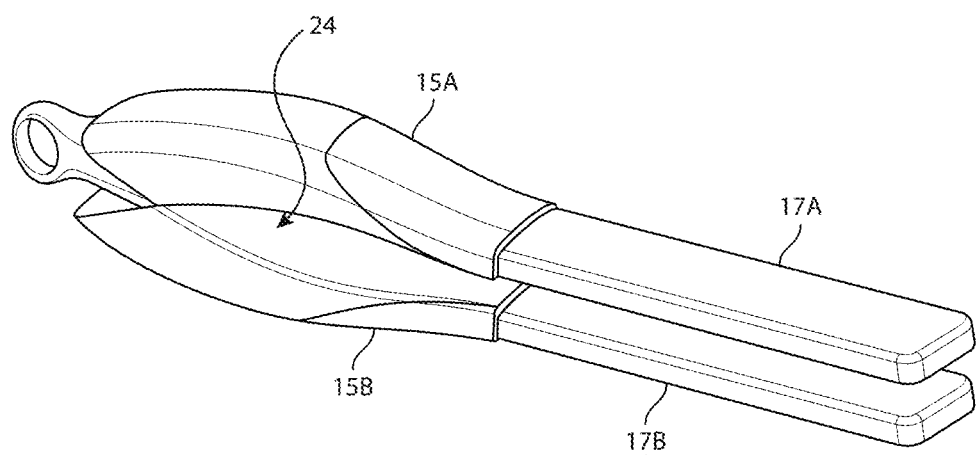
FIG. 11 illustrates another example embodiment of the plant treatment device of FIG. 1, according to one or more embodiments.

In various embodiments, the disclosed handheld device 100 may comprise a curved handle 104 (e.g., the arm 12A and the arm 12B) such that the first side arm 102 and the first side arm 103 are curved on the inside (e.g., in example of the opening 24 of FIG. 1), for example as further illustrated in FIG. 11. The curved side of the first side arm 102 and the second side arm face each other to form the handle 104.

Figure 12:
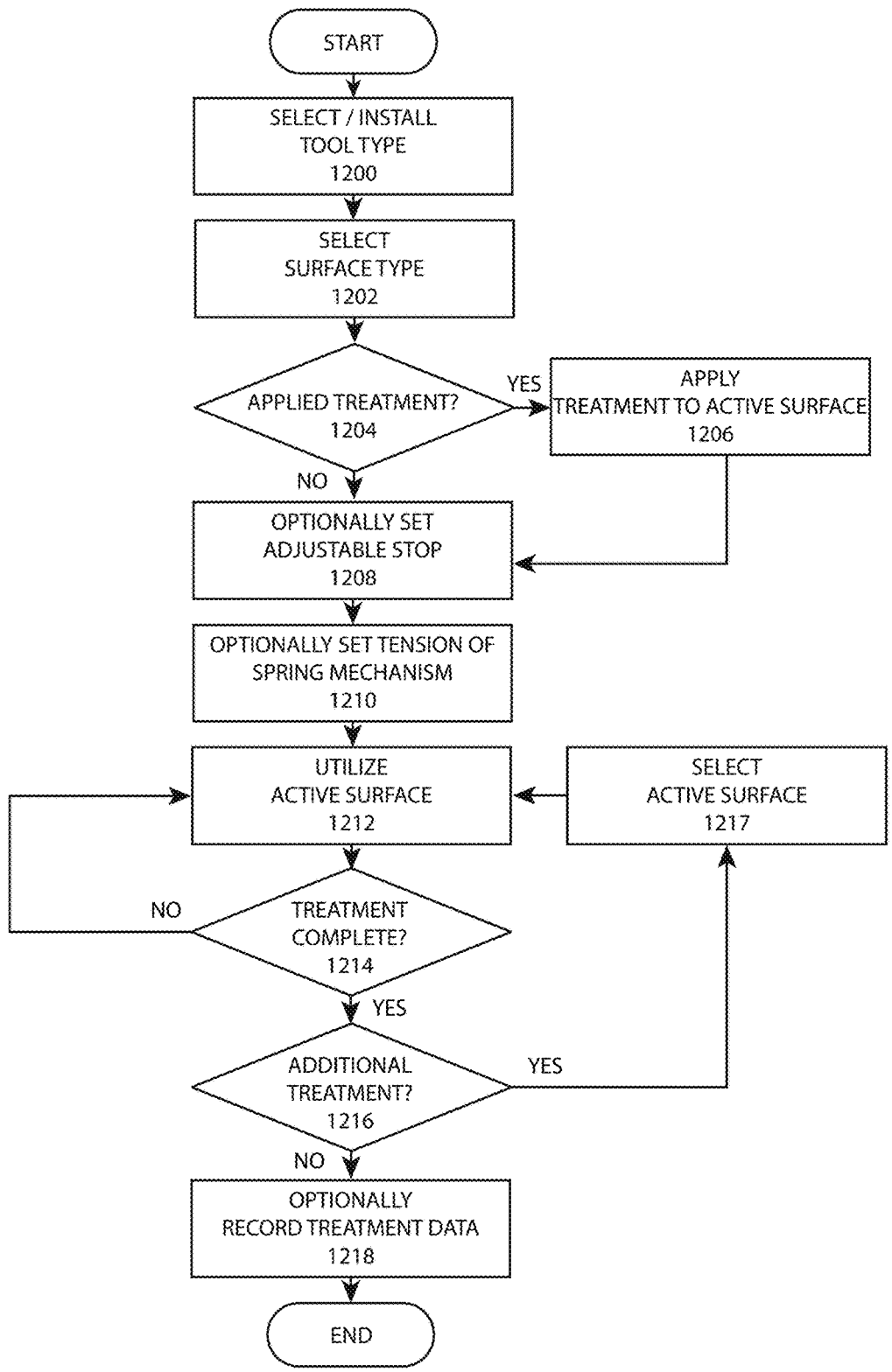
FIG. 12 illustrates a treatment process flow, according to one or more embodiments.

FIG. 12 illustrates a treatment process flow 1250, according to one or more embodiments. Operation 1200 selects and/or installs a tool type. The tool type may be a tool attachment that attaches to the extension arm 15 and/or the head 17 (e.g., including utilizing the coupler 16, as further shown and described in conjunction with the embodiment of FIG. 1). For example, the tool may include one or more instances of a treatment surface 18, one or more instances of a sensor 22, and/or other tools. The tool may be selected for a particular type of plant care task, for example cleaning, pruning, collecting data, and/or applying treatments. In one or more embodiments, the tool may be specialized for a particular type of plant (e.g., a specialized tool for palms, ferns, flowers, grasses, etc.). For example, the tool may be a low-density polymer intended for cactus spines to penetrate such that a cleaning surface can reach cladode surfaces. In another example, it may be advantageous to configure a cleaning surface with particularly soft, flexible fibers so that various pinnate leaves of ferns that may run both parallel and perpendicular to a main stem do not catch and/or are not damaged during cleaning. In one or more embodiments, a plant treatment device 10 may be worn with a belt that includes multiple tools and/or tool attachments for easy switching. In one or more embodiments, there may be different modalities within the same tool that may be useful for certain plant care operations, such as cleaning and pruning. For example, a double-sided tool may include one treatment surface 18 and one blade edge, where each of two instances of such a tool may be installed on the extension arm 15A and the extension arm 15B, able to be actively configured by the user as both "cleaning forceps" and/or "plant pruners".

The tool may be installed through a variety of devices, systems, and/or methods. For example, and as also described in conjunction with the embodiments of FIG. 2A through FIG. 2C, the tool may attach and/or adhere to the head 17 through a fastening surface 26 and/or a sleeve cavity 27 that utilize hook-and-loop connectors (e.g., Velcro®), friction-fit, adhesives, cleats, buttons, and/or magnets. Alternatively, or in addition, mechanical couplers may be used, including pins, tacks, clips, quick-connect couplers, bolts, screws, a chamfered collar-lock system and/or other fasteners. In one or more embodiments, plastic or rubber interlocking "teeth" may be included, where such interlocking "teeth" are configured to receive a cloth or flexible treatment surface 18 that can be pushed in (e.g., as may be utilized in a Swiffer Sweeper®). The tool may be easily removed and replaced, for example on a belt or other storage location of a user, enabling adaptation to a different plant type or treatment objective. Certain tools may utilize a data and/or power interface (e.g., the attachment power interface 1320) that may be included in the plant treatment device 10, for example a tool including an electronic probe, one or more instances of a sensor 22, a powered rotational cleaning head, etc.

Operation 1202 selects a surface type. Referring to FIG. 2B, for example, the active surface 25A or the active surface 25B may be selected. In one or more embodiments. In the example above including a double-sided tool having one blade edge, the treatment surfaces 18 may be selected (e.g., turned to using the rotational element 21) for cleaning, and the blade elements may be selected (e.g., turned to using the rotational element 21) for pruning, where the two blades may come into contact to form a scissor-like cutting zone along each head 17 and proceeding down the blade edges as the hinge 11 closes. A surface type may also be selected for particular application of a chemical agent or biological agent, selected as a pollination brush for collecting and/or spreading pollen, and/or selected for other plant care purposes.

Operation 1204 determines whether a treatment is to be applied. Where a treatment is to be applied, operation 1204 may proceed to operation 1206, which may apply a treatment to the tool (e.g., the active surface 25 of the treatment surface 18). The treatment may be applied through a variety of devices, systems, and/or methods. In one or more embodiments, a spray, aerosol, powder, gel, and/or liquid may be directly applied to an active surface 25 that is absorptive and/or otherwise includes structure sufficient to receive and/or re-apply the treatment. The treatment may be, for example, a pesticide (e.g. diluted diatomaceous earth, essential oils, etc.), a fungicide, a nutrient (e.g., zinc) a biological agent (e.g., ladybugs, *Bacillus thuringiensis*), a protectant, a cleaning agent (e.g., diluted ethanol, vinegar, and/or essential oils; bleach, oxidizing agents, etc.), and/or other treatments. In one or more embodiments, the treatment may be water-based solutions or plant tonics consisting of neem oil, castile or dish soap, vinegar, lemon juice, coconut oil, mineral nutrients, organic nutrients, marine plant extracts, humic acid, fulvic acid and/or other plant or essential oils. In one or more embodiments, the plant treatment device 10 may include a dispenser and/or reservoir for the treatment, which may be automatically and/or manually applies in operation 1206. For example, the plant treatment device 10 may include a reservoir 1316, as also shown and described in conjunction with the embodiment of FIG. 13, that may be utilized to spray, drip, introduce by capillary action, and/or osmotically introduce a liquid treatment to the active surface 25. If no treatment is to be applied, operation 1204 proceeds to operation 1208.

Operation 1208 operationally sets an adjustable stop (e.g., the adjustable stop 19 of FIG. 1). The adjustable stop 19 may be utilized to limit closure of the hinge 11, the extension arm 15A and the extension arm 15B, and/or the head 17A and the head 17B). Certain tools and/or certain applications may benefit from a stopping point in the closure of the hinge 11, for example to ensure that the grip between each instance of the head 17 is not too tight and/or does not apply too much pressure, to ensure certain tools work as intended (e.g., correct closure of scissor-like surfaces), etc.

Operation 1210 optionally sets a tension of a spring mechanism (e.g., the spring mechanism 18). Certain tools and/or certain cleaning or treatment applications may benefit from increased and/or decreased resistance in the closure of the hinge 11, for example, to ensure that the grip between each instance of the head 17 is not too tight and/or does not apply too much pressure, to ensure certain tools work as intended, etc. In one or more embodiments, the plant treatment device may include two or more spring mechanisms 18 that may be activated, deactivated, and/or configured by a user, including for example switching whether an active spring mechanism 18 defaults to keeping the hinge 11 open or closed through a restoring force of the spring mechanism 18.

Operation 1212 utilizes the active surface 25 (and/or other selected tool). For example, the user may clean a leaf, apply a treatment to a stem, take data from bark or exposed phloem of a tree trunk. Other tools may also be utilized, for example taking soil samples or readings with a pH meter attachment. It will be recognized that in the context of scientific studies or agricultural research, pests or diseases may be intentionally applied to a plant as the "treatment".

Operation 1214 determine whether the treatment is complete. In one or more embodiments, treatment completion may be determined manually, including at the discretion of the user based on visual or other perceptual inspection. For example, the user may make a visual inspection to determine whether a leaf is clean, whether it appears a treatment has been adequately applied, etc. In one or more embodiments, treatment completion may also be determined through one or more sensors 22 and/or a treatment routine 1318. In what may be a straightforward example, the sensor 22 may gather a signal and/or data related to application of the treatment. For example, the signal may be a spectroscopic signature of an applied treatment (e.g., an IR signal of a chemical functional group and/or other spectroscoptic chemical signature). The user may apply the treatment, then test whether application was successful, quantitative and/or qualitatively, by utilizing the sensor 22. In the context of scientific research, this may also promote data accuracy and integrity. In commercial and/or agricultural operations, data gathering on the treatment may be advantageous to help ensure the plant is not overly treated and/or to save resources by limiting the need to over-treat the plant that may otherwise be required to ensure sufficient treatment. Where the treatment is complete, operation 1214 proceeds to operation 1216. If treatment is not yet complete, operation 1214 returns to operation 1212 for continued treatment.

Operation 1216 determines whether an additional treatment should be applied. For example, each plant may require one or more different treatments such as dry dusting, wet cleaning, and/or one or more treatment applications. If an additional treatment is to be applied, operation 1216 may proceed to operation 1217 in which a new active surface (e.g., the active surface 25B) and/or other tool may be selected. Operation 1217 may then return to operation 1212 for utilization of the newly selected tool and/or active surface. If no additional treatment is to be applied, operation 1216 may proceed to operation 1218 which may optionally record treatment data. The treatment data may be recorded manually or automatically. For example, a user may write down in a notebook the initial state of the plant or portion thereof before treatment, an intermediate state of the plant or portion thereof during treatment, and/or a final state of the plant or portion thereof following treatment. Treatment data may also be recorded automatically, for example by scanning the plant with one or more sensors 22 to determine whether the state of the plant and/or its treatment was adequate. As just one example, where microbial "rust" spots are detected on one or more leaves of a plant as an initial state (e.g. prior to treatment), operation 1218 may determine the rust spots have been adequately scoured and/or treated through a change in color of the one or more leaves. As further shown and described in conjunction with FIG. 14, each plant or portion thereof may include identifiers and/or unique identifiers that can be referenced during data gathering.

One or more operations of the process flow of FIG. 12 may be applied to each of one or more plants in turn, for example within a residence, commercial office building (e.g., common areas), hotel lobby, restaurant, retailer, greenhouse, agricultural operation, laboratory, space station, etc. An enterprise, company, operation, team, and/or user may develop and maintain appropriate procedures for each plant and/or plant species, which may be developed in conjunction with existing data, species-specific literature, cultural knowledge, and/or, if necessary, minor experimentation.

FIG. 13 illustrates a plant treatment device 1300, which is an example embodiment of the plant treatment device 10 that includes electronics and/or additional elements, according to one or more embodiments. The plant treatment device 1300 may include a processor 1302 and a memory 1304. The processor 1302 may be a computer processor, for example a CPU and/or a microcontroller, and the memory 1304 may be a computer readable memory, for example random access memory (RAM), read only memory (ROM), solid state memory (e.g., SATA), etc. The plant treatment device 1300 may include a display 1306, for example an LED and/or LCD display. Alternatively, or in addition, the plant treatment device 1300 may utilize a display external to the plant treatment device 1300 but communicatively coupled to the plant treatment device 1300, for example through communicative coupling to another computing device such as a smart phone, tablet computer, and/or laptop computer. The display 1306 may be utilized to display treatment options, plant information, treatment data results, determined conditions, various indicators and/or operations related to a treatment routine (as further described below), and/or other information or data. The plant treatment device 1300 may further include a control interface 1308, for example one or more physical buttons and/or one or more simulated buttons (e.g., a graphical user interface of the display 1306, etc.). The control interface 1308 may be used, for example, for initiating the treatment routine 1318, the user indicating when a new plant and/or plant identifier should be scanned, the user indicating when treatment is being initiated or completed, and/or other operations, including without limitation one or more operations of the process flows of FIG. 12 and FIG. 14. Although not shown in FIG. 13, the plant treatment device 1300 may include a speaker or other means for providing a sound as part of the user interface.

In one or more embodiments, the plant treatment device 1300 may include a data interface 1310. The data interface 1310 may include a communication connection port for a tool and/or attachment, for example one or more instances of the sensor 22, an attachment or tool utilizing the sensor 22. For example, the data interface 1310 may include a USB connector (e.g., USB-b micro, USB-c), a serial port, a custom or proprietary data connector, etc. The data interface 1310 may also, or alternatively, communicate analog signals. The data interface 1310 may include the attachment power interface 1320 (e.g., low voltage power provided over USB), which may in one or more embodiments communicate power to a tool or attachment. The attachment power interface 1320, for example, may provide power to a tool or attachment that may include spinning motorized heads or vibrating elements designed or usable for cleaning, scouring, polishing, conditioning, abrading, and/or scarification.

The plant treatment device 1300 may include a power supply 1312 to one or more electronic and/or electromechanical elements of the plant treatment device 1300. The power supply 1312 may be electrically coupled to and/or provide power to the processor 1302, the memory 1304, the display 1306, the control interface 1308, the data interface 1310, the UV emitter 1324, the barcode scanner 1322, one or more sensors 1326, and/or other elements. The one or more sensors 1326 may also include a camera for static photography and/or a video camera that may be utilized for documentation and/or to collect photo and/or videographic data for manual and/or automated analysis of plant condition. The power supply 1312 may supply power with an alternating current, a direct current, through a chord (e.g., a 60 Hz, 120 v wall socket, a direct DC solar panel connection), through "cordless" source (e.g., a chemical battery, a capacitor battery), and/or another suitable power source.

In one or more embodiments, the sensor 22 and/or the sensor 1326 may include one or more cameras that may be a hyperspectral and/or multispectral imaging camera. In one or more embodiments, the sensor 22 may include a chlorophyll fluorescence imaging instrument (e.g., active sensors with an LED or laser light source that assesses photosynthetic electron transfer). In one or more embodiments, the sensor 22 and/or the sensor 1326 may include a sensor for assessing plant biomass and/or plant architecture, for example, photogrammetric solutions such as stereo cameras, 3D laser scanners, ultrasonography, and/or densitometry that may be used to potentially distinguish information about plant biomass or plant tissue architecture (e.g., leaf density, hollows in tree trunk sub-surface, etc.).

The plant treatment device 1300 may include a fluid applicator 1314 that may include a mechanically, pneumatically, and/or electrical-mechanical driven pump for moving liquid from a reservoir 1316 to treatment surface 18 and/or directly to the plant. In a straightforward example, the reservoir 1316 may be a plastic bottle or vessel internal and/or external to the plant treatment device 1300 that may be filled with water and sprayed onto the treatment surface. For example, a traditional hand-operated spray bottle mechanism including a nozzle valve, one or more springs, a set of one or more internal valves, a set of one or more pistons exercised by a trigger or lever (e.g., integrated into the handle), a liquid intake, and/or a gasket sealing a connection to the reservoir 1316. The liquid may be a treatment chemical, water for cleaning, water for misting (e.g., for tropical plants), and/or liquid for other uses related to plants (e.g., liquid fertilizer or other nutrients to be sprayed on soil or roots).

In one or more embodiments, the plant treatment device 1300 may include a treatment routine 1318. The treatment routine 1318 may include a set of computer readable instructions (e.g., stored on the memory 1304) that when executed (e.g., by the processor 1302 and/or one or more other processors in supporting device, such as the server 1330) may assist in and/or guide treatment of one or more plants with the plant treatment device 1300. In one or more embodiments, the treatment routine 1318 may include computer readable instructions that when executed: (a) receives a plant ID, (b) determines a plant individual, species, and/or type based on the plant ID; (c) determines a previous state of the plant associated with the plant ID, if any; (d) determines a current state of the plant associated with the plant ID, if any; (e) determines a recommended treatment data based on at least one of the previous state and the current state; (f) provides a treatment recommendation and/or loads a treatment instruction based on the recommended treatment data; (g) receives a treatment data from at least one of the user and a sensor 22; (h) determines that the treatment data exceeds a threshold for treatment; and/or (i) logs the treatment data and/or informs the user the treatment data has exceeded the threshold treatment.

A specific example of the treatment routine 1318 is now provided. A sensor 22 may be defined to detect a certain wavelength of light emitted from a UV-absorbing/visible light emitting molecule (e.g., a fluorescent probe). The molecule may be dissolved in a treatment in a known concentration. The UV emitter 1324 may be utilized to emit UV light which is absorbed by the molecule, which may then emit visible light in a narrow range of wavelengths detectable by a light sensor and/or spectrometer (e.g., an instance of the sensor 22). The treatment routine 1318 may (i) instruct the user to scan an identifier of a plant, such as a barcode located on a pot, plaque, trunk (e.g., scanned via the barcode scanner 1322); (ii) determine that no current treatment is on a leaf when the user grips the leaf between the head 17A and the head 17B; (iii) instruct the user to apply a single spray of liquid treatment containing the molecule; (iv) determine that the concentration of the molecule is not sufficient based on the light emission intensity when the user again grips the leaf between the head 17A and the head 17B, (v) instruct the user to again apply a single spray of the liquid treatment; (vi) determine that the concentration of the molecule is sufficient based on the light emission intensity when the user again grips the leaf between the head 17A and the head 17B; and (vii) instruct the user to move to the next plant for sensing and/or treatment. The treatment routine 1318 may additionally carry out one or more operations of the embodiment of FIG. 14, as further described below.

The plant treatment device 1300 may further include an attachment power interface 1320 for providing power to an attachment and/or tool. For example, in one or more embodiments the tool may include motors, actuators, electromagnets, sensors, and/or other powered elements that may receive power from the power supply 1312 via the attachment power interface 1320.

In one or more embodiments, the plant treatment device 1300 may include a barcode scanner 1322. The barcode scanner 1322 may utilize a laser or another visual device, system, and/or method to read a visual identifier, such as a barcode, QR code, or other identifier. In one or more embodiments, the barcode scanner 1322 may be provided by a mobile device running a software application (e.g., App) communicatively coupled with the plant treatment device 1300. The barcode scanner 1322 may be utilized to scan one or more identifiers of a plant or portion thereof, which may provide for automatic data tracking within a home, commercial facility, agricultural operation, and/or laboratory.

In one or more embodiments, the plant treatment device 1300 may include a UV emitter 1324. The UV emitter may be utilized, for example, to treat disease or kill pests (e.g., fungi, bacteria, insects), sense treatment effectiveness (e.g., UV indicators and/of florescent indicators, as in the above example), prepare plants for outside sunlight (e.g., provide controlled UV shock), detect UV indicators on stains or other UV-tagged indicators designed to adhere to certain pests, and/or other functions that may be known in the art of plant care and maintenance. In one or more embodiments, the UV emitter 1324 may only be activated when the head 17A and the head 17B are closed such that a user may be protected from UV exposure.

In one or more embodiments, the plant treatment device 1300 may include one or more sensors 1326 (e.g., instances of the sensor 22 of FIG. 1). A sensor 1326A may include a spectroscope and/or spectrometer able to detect wavelength and/or intensity in one or more wavelengths of the electromagnetic spectrum, and specifically infrared, visible, and/or ultraviolet light. The sensor 1326A may be useful for detecting plant condition, plant health, plant temperature, plant species and/or identity, treatment effectiveness, and/or other information. In one or more embodiments, the sensor 1326A may be paired with a light source and/or an emission source such as the UV emitter 1324.

In one or more embodiments, the sensors 1326 may include one or more chemical sensors, illustrated in FIG. 13 the chemical sensor 1326B. For example, the chemical sensor may be able to detect certain molecules related to plant health or nutrition (e.g., nitrates), and/or molecules that may be produced by certain pests, fungi or mold (e.g., hydrogen sulfide, ammonia, tests known in the art for detection of complex organic molecules characteristic of a certain species, etc.). In one or more embodiments, the chemical sensor 1326B may be an artificial nose that may detect a molecular profile of one or more species, treatments, and/or conditions. Complex signals, profiles, and/or spectra may be communicated through a network 1301 to one or more servers (e.g., the server 1330) for analysis.

In one or more embodiments, a sensor 1326 may include a pressure sensor, illustrated as the pressure sensor 1326A. The pressure sensor 1326C may determine pressure at one or more locations along the head 17A and/or the head 17B (including through any treatment surface 18). A pressure reading may be provided through the display 1306 or other interface (e.g., a sound interface), such as a sound when a threshold and/or appropriate pressure is reached. The pressure sensor may be useful when assisting a user in determining how much and/or what amount of pressure is enough when closing the arms 12 (e.g., the extension arm 12A and the extension arm 12B) of the plant treatment device 10, according to one or more embodiments. In one or more other embodiments, certain treatments and/or preferred treatments of the treatment routine 1318 may require and/or have a preferred pressure. The pressure may also be utilized a measure. For example, where the arms 12 are actuated by a mechanical and/or electro-mechanical element, the pressure sensor may determine when actuation should cease, the shore hardness of a target portion of the plant (e.g., a collection of stems, a fruit, etc.), and/or may be used to collect other data related to hardness.

The sensors 1326 may include one or more moisture sensors, illustrated in FIG. 13 as the moisture sensor 1326N. The moisture sensor 1326N may be useful to determine whether the plant has sufficient hydration, treatment (e.g., where leaves should be washed with liquid but then left dry), and/or a condition. If configured on a probe, the sensor 1326 may be useful for testing soil.

In one or more embodiments, the sensors 1326 may include a camera, including without limitation an infrared or thermal imaging camera, and/or a an LED light to illuminate the plant and/or improve imaging by the camera. The camera may take photo data and/or video data that may be analyzed for color, leaf size, leaf shape, leaf thickness, and the size, shape, and/or thickness of other plant elements (e.g., stems, trunk, root, flowers, etc.).

In one or more embodiments, data collected on one or more of the sensors 1326 may be compared to adjacent and/or nearby plants, previous baseline and/or control data collection, and/or species-specific data. As a result, a user and/or organization may be able to rapidly and at relatively low cost detect irregularities.

In one or more embodiments, one or more of the sensors 1326 may be utilized to detect a residual treatment. This may be useful in determining treatment effectiveness, and/or in determining whether a new round of treatment and/or a different treatment should be applied. For example, in one or more embodiments a chemical sensor 1326B may be utilized to detect azadirachtin or other signature constituents of neem oil, and/or fluorescent markers may be utilized to detect previous application of BT toxin.

In one or more embodiments, the plant treatment device 1300 may be communicatively coupled to one or more other devices, for example through the network 1301 via a wired and/or wireless interface (e.g., Bluetooth®, a WiFi network, and/or the internet). In one or more embodiments, the plant treatment device 1300 may be communicatively coupled with a server 1330 that may include a treatment application 1332 and/or a treatment database 1334. The treatment application 1332 may include back-end computer readable instructions and/or an administrative portal that may support one or more instances of the plant treatment device 1300, users thereof, and treatment routines 1318 thereon. For example, the treatment application 1332 may include a library of treatment techniques, routines, and/or condition recognition data that may be queried and/or utilized by the treatment routine 1318, according to one or more embodiments. The treatment database 1334 may include data stored in a database describing one or more plants, their state, condition, user interactions (e.g., a user ID of a user collecting data and/or applying a treatment), treatment results, and dates thereof. In one or more embodiments, the treatment database 1334 may include a plant profile for each plant within a residence, commercial facility, agricultural operation, laboratory, and/or space station. The plant profile may include a unique identifier and/or unique identifiers for portions of the plant, for example that may be selected or scanned by the user prior to collection of data and/or treatment. The plant profile may include plant data, such as taxonomic data, species, origin, age, another other data. The treatment database 1334 may enable multiple users, possibly each which may be assigned and/or utilize one or more different instances of the plant treatment device 1300 that may permit sharing and/or contribution to a common dataset. As just one example, a first user may scan a plant identifier (e.g., with the barcode scanner 1322), generating a query against the treatment database 1334 that indicates that the plant was treated the day before by a different user, and therefore does not require additional treatment by the first user. In another example, an administrator may determine that employees responsible for, and/or contractors having maintenance contracts for, commercial and/or agricultural pants are performing their duties correctly.

Although multiple elements are illustrated in FIG. 13, it will be evident to one skilled in the art that only some of these elements may be present in any given instance of plant treatment device 10.

Figure 14:
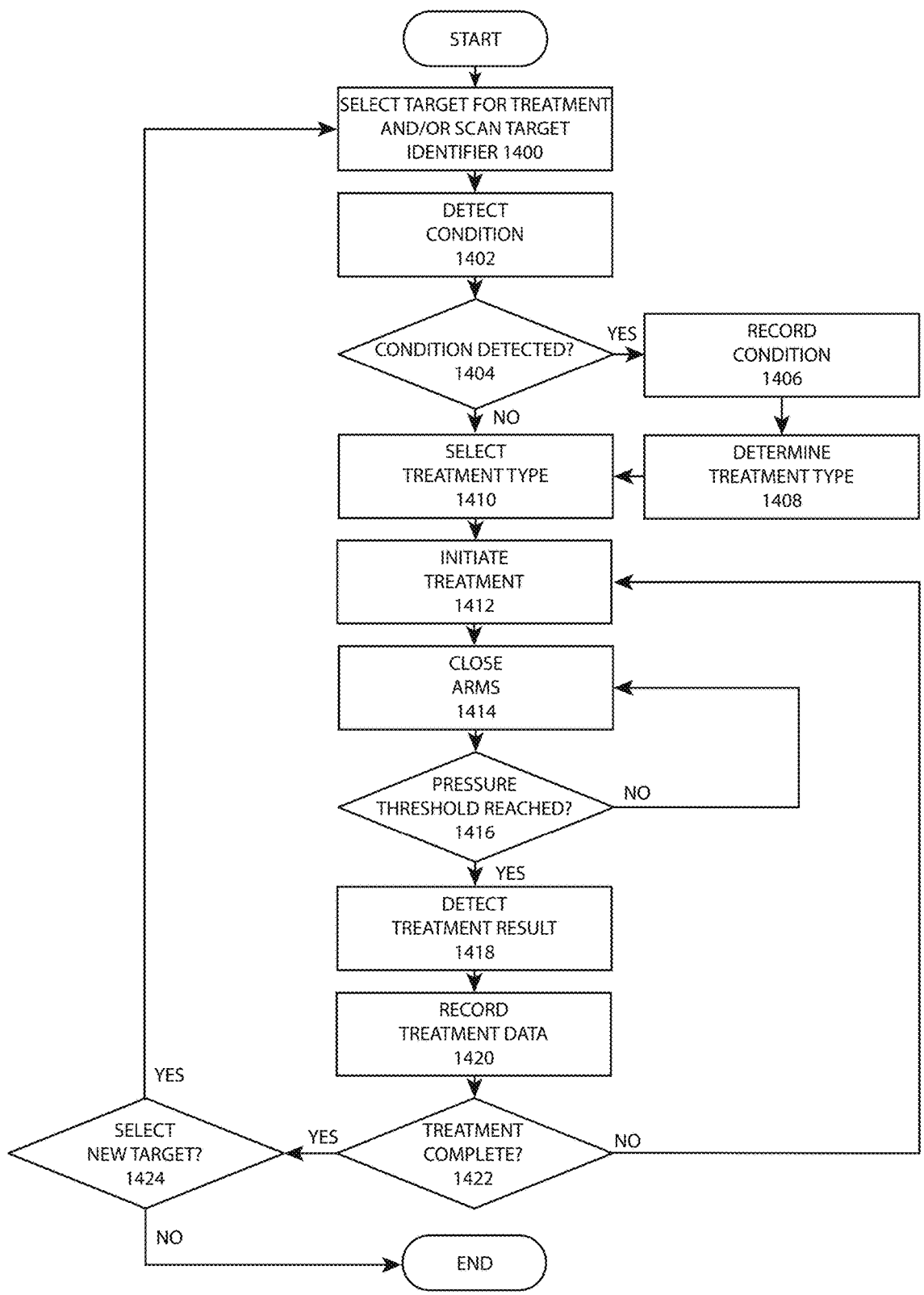
FIG. 14 illustrates a treatment data process flow, according to one or more embodiments.

FIG. 14 illustrates a treatment data process flow 1450, according to one or more embodiments. Operation 1400 selects a target (e.g., plant, fungi, or portion thereof) for treatment and/or scans a target identifier. For example, a user may select the plant on a companion app out of a list of plants, may select a type of plant, and/or may select a plant directly on an interface of the plant treatment device 10. Alternatively, or in addition, the user may scan a barcode, QR code, or other identifier associated with the plant, for example as may be mounted on or next to the plant. The plant identifier may be sent to a server to query a plant profile, according to one or more embodiments. The identifier may alternatively select a portion of a plant. For example, in the case of a tree, individual identifiers may have been applied to each section of roots, portion of the trunk, major branch, etc., such that individual elements or portions of the tree and data therefore can be distinguished including optional discrete modeling in the treatment database 1334.

Operation 1402 detects a condition of the target, for example through signals and/or data from one or more sensors 22. For example, the condition may be a moisture level, a dust level, a dirt level, a chlorophyll level, a disease detection, a disease level, a pest detection, a pest level, and/or other disease or health indicators.

Operation 1404 may determine whether a condition has been detected. Where a condition has been detected, operation 1404 may proceed to operation 1406 which may record the condition, for example as an entry in a database associated with the plant profile (e.g., the treatment database 1334). The condition may also be logged in other plant profiles. For example, where a plant is determined to have a certain disease condition, it may be recorded on all other plant profiles that have an association with the diseased plants, e.g., location in the same facility and/or geospatial proximity (e.g., as determined from GPS coordinates on other plant ID scans and/or from designation that the plants are in the same greenhouse or growing area). Operation 1406 may then proceed to operation 1408, which may determine a treatment type associated with the condition. In one or more embodiments, the treatment type may be determined based on the condition detected, the condition level, and/or available treatments within a treatment application (e.g., the treatment application 1332). Treatment type may be additionally determined based on previous treatments and/or treatment effectiveness as may be queried from a treatment database.

It will be noted that a sensor 22 utilizing a thermal cameras and/or thermal imaging may be able to be used to detect plant temperature and/or color changes over time. Such changes may be able to assist in identifying diseased and/or at-risk plants, including early on prior to visible symptoms. Infected plants may therefore be able to be isolated from other plants and treated to prevent spreading. In another example, thermal imaging and/or measurements can be used to detect plants that overheating or subject to disadvantageous local environments, for example within a grow facility or greenhouse.

In one or more embodiments, where no condition is detected, operation 1404 may return to operation 1400 (not shown in the embodiment of FIG. 14). However, as shown in the embodiment of FIG. 14, in one or more other embodiments a baseline and/or default treatment may be selected and applied, for example general dusting or cleaning.

Operation 1410 may select a treatment type, either based on the determined treatment type 1408 and/or a different treatment type. For example, where no condition is detected, the treatment types selected may be a simple dusting or water-based cleaning. Where a treatment type was automatically determined, operation 1410 may automatically select the determined treatment type and/or present the treatment type to the user (e.g., on a user interface, including a networked device such as a smartphone) for confirmation and/or further selection of options). Selecting the treatment type may include selecting a tool, a surface type, adjustable stop, and/or tension of a spring mechanism (e.g., the spring mechanism 18), as further shown and described in conjunction with the embodiment of FIG. 12.

Operation 1412 initiates the treatment. The user may position the plant treatment device 10 for treatment, for example placing the leaves and/or steps within gap between the head 17A and the head 17B. Operation 1412 may be completed by robotic and/or human appendages wielding the plant treatment device 10.

Operation 1414 closes the arms of the plant treatment device 10, for example as shown and described in conjunction with FIG. 7 and FIG. 8. It should be noted that other modes of treatment utilizing the plant treatment device 10 may treat without closing the arms. For example, a tool may include an injector protruding from one instance of the head 17 (e.g., the head 17A) for injecting a medicine or other treatment directly into a plant tissue.

Operation 1416 determines whether a pressure threshold has been reached. A pressure sensor (e.g., the pressure sensor 1326C of FIG. 13) may be utilized to detect a pressure, and feedback provided to a user through a user interface and/or to a software application (e.g., the treatment routine 1318). Where the pressure threshold has not been reached, operation 1416 may return to operation 1414 and the arms may continue to close. Where the pressure threshold has been reached, operation 1416 may proceed to operation 1418. The pressure threshold may be determined based on the plant type and/or portion thereof, for example as determined by the plant profile associated with the plant identifier. Once sufficient pressure is reached, the plant treatment device 10 may be drawn along the leaf, plant element, or portion thereof to clean it and/or apply a treatment.

Operation 1418 detects a treatment result. For example, the plant treatment device 10 may utilize one or more sensors (e.g., the sensors 22, the sensors 1326) to determine the success and/or sufficiency of the treatment. Alternatively, or in addition, the treatment result may be determined to be a non-error occurrence, for example that the arms closed, sufficient pressure threshold was reached, and/or no error occurred. Errors could include, for example, a "catch" when drawing the heads 17 down a stem or leaf, anomalous data collection, pressure reading deviating from the threshold and/or a target pressure, failure of a treatment such as the reservoir running dry during a liquid application, and other failures of successful operation.

Operation 1420 may record treatment data. The treatment data may include data from one or more sensors 22, a timestamp associated with the treatment, a user ID of a user applying the treatment, the plant identifier (and/or plant element identifier), a device ID for the plant treatment device 10 providing the treatment, a GPS coordinate associated with treatment (which may be determined based on a GPS receiver of the plant treatment device 10 and/or an associated device such as a smartphone), and/or other treatment data or metadata.

Operation 1422 determines if treatment is complete. If not, operation 1422 may return to operation 1412. It will be noted that each treatment may be separately recorded, even of the same plant and/or plant element. For example, where a first cleaning occurs of a leaf and its result detected in operation 1418, the data for the first cleaning may be recorded in operation 1420. Where operation 1422 returns to operation 1412, a second application of operation 1418 may record the second treatment of the leaf, for example in a separate entry of the plant profile. Completion of treatment in operation 1422 may be determined based on a detected treatment result in the treatment data exceeding a threshold, treatment experiencing an error, and/or treatments exceed a number of attempts.

Where treatment is determined to be complete in operation 1422, operation 1422 may advance to operation 1424. Operation 1424 may determine if a new target is to be selected. If a new target is to be selected, operation 1424 may return to operation 1400. Otherwise, operation 1424 may end.

Figure 15:
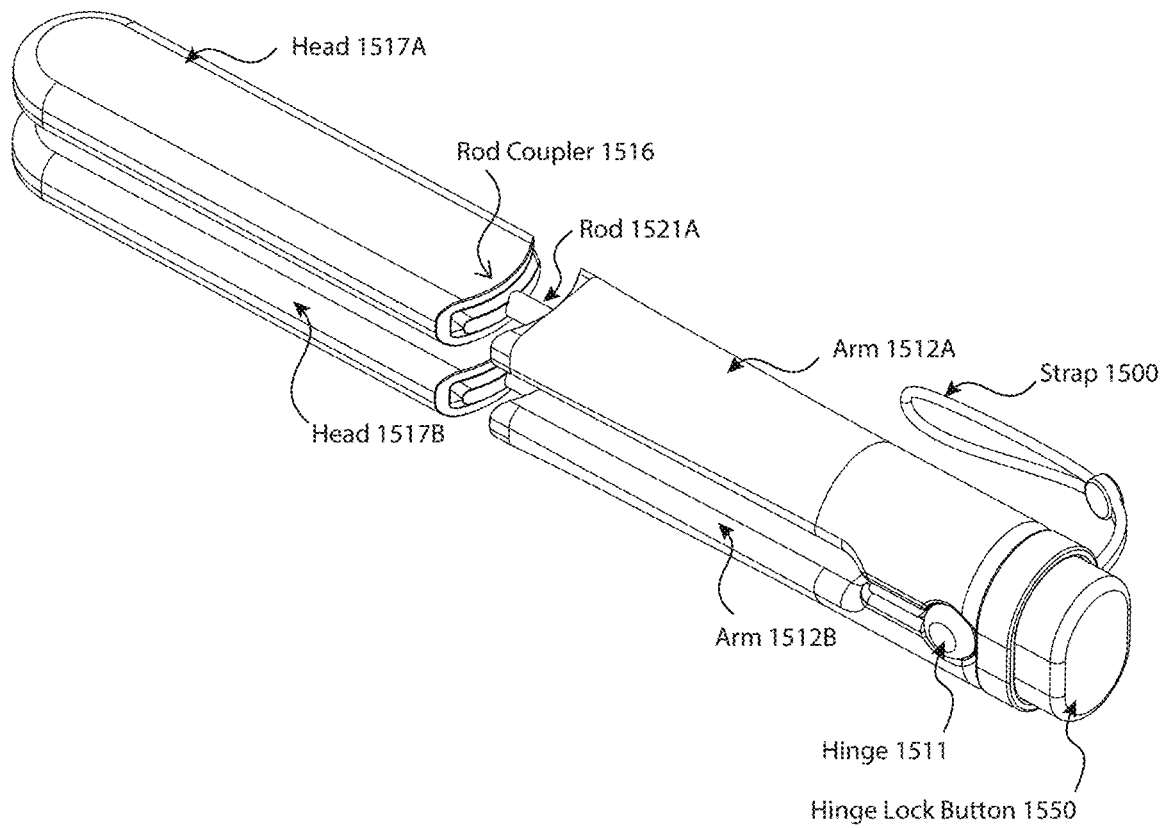
FIG. 15 illustrates another example of the plant treatment device, according to one or more embodiments.
Figure 16:
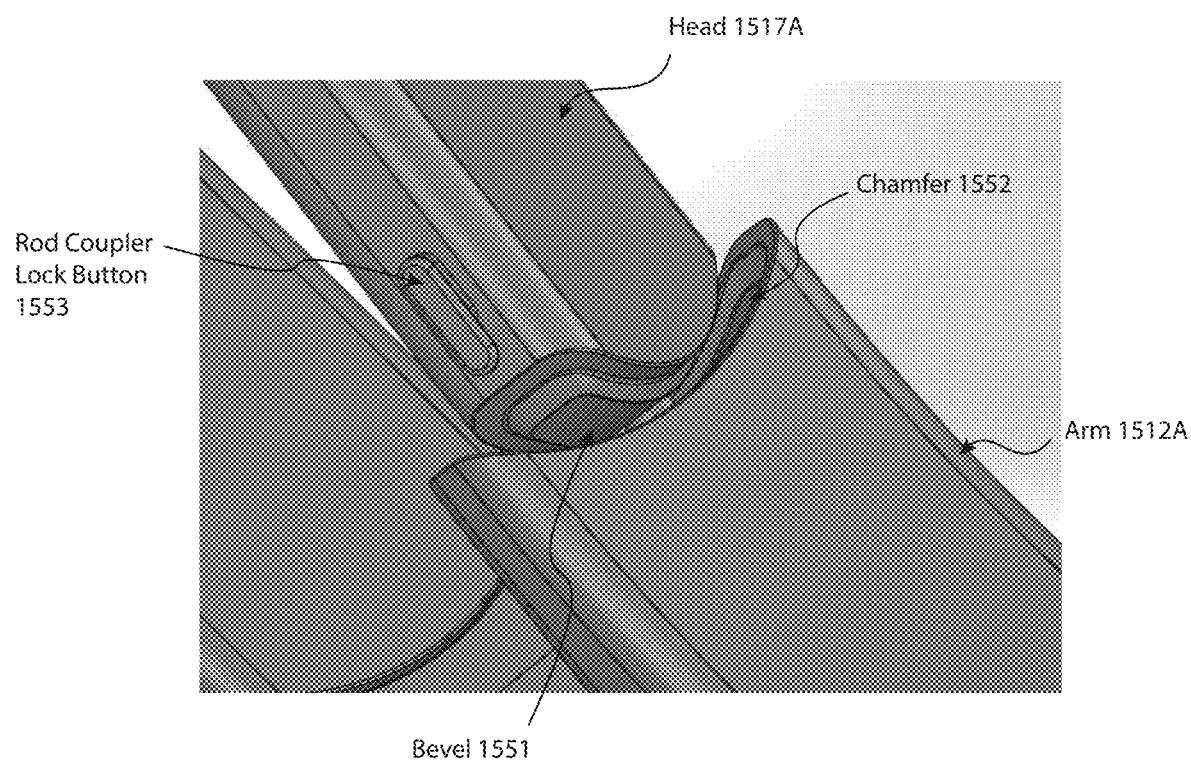
FIG. 16 illustrates an example of fixed locking positions of the head and one possible coupling mechanism of the rod coupler of FIG. 15, according to one or more embodiments.

FIG. 15 and FIG. 16 illustrate another example of the plant treatment device 10, according to one or more embodiments. The plant treatment device 10 of FIG. 15 and FIG. 16 may include a strap 1500 that may be a strap and/or loop for easy storage, handing, and/or clipping to a belt or other tool holder. The strap may be made of cord, rope, polymer, rubber, plastic, or other suitable material. A first arm 1512A is coupled to a second arm 1512B through a hinge 1511. The pair of arms (e.g., the arm 1512A and the arm 1512B) may be locked in a closed position through a locking mechanism, specifically a hinge lock button 1550 that may engage a pin sliding into an internal element to hold the hinge 11 in a closed position and/or the arms 12A and the arms 12B in a closed position. The arm 1512A and the arm 1512B may be each coupled with a rod 1521 (e.g., a rod 1521A and a rod 1521B) that may each permanently or removably couple with a head 1517 (e.g., the head 1517A and the head 1517B, respectively). Each rod 1521 may rotate (e.g., an example of the rotational element 21 of FIG. 1), including optional fixed locking positions (e.g., as may be known in the art as an indexing plunger). For example, the optional fixed locking location may occur at 180 degrees (e.g., two-position). Each rod 1521 may be removably and/or temporarily coupled to each head 1517 through a rod coupler 1516, for example a friction fit connection, a quick connect coupler, a groove around the circumference of the rod 1521 which locks into protrusion inside a receive hole of the head 17, etc.

FIG. 16 illustrates an example of fixed locking positions of the head 1517 and one possible coupling mechanism of the rod coupler 1517. The head 1517 may be rotated by a user pulling outward relative to the handle to tension a spring coupled to the rod 1521, causing lengthening of the rod 1521 and disengaging a bevel 1551 of the head 1517 from the chamfer 1552 of the arm 1512A. Once the head 1517 has been rotated 180 degrees, for example to expose a different treatment surface 18, tension may be released causing the re-engagement of the bevel 1551 and the head 1517. The head 1517 may be removed, according to one or more embodiments, by the user depressing the rod coupler lock button 1553, which may disengage a pin fixing the rod 1521 within the head 1517.

FIG. 17A illustrates an example of a hinge lock mechanism in an engaged position from a top section view, according to one or more embodiments. A hinge lock button 1750 comprising a lock pin 1751 may be coupled to a cam 1700 that moves along a cam track 1701 while under tension from a cam spring 1702, resulting in insertion of the lock pin 1751 and/or removal of the lock pin 1751 from a lock hole 1752 defined on an interior of the arm 1712A. FIG. 17B illustrates an example of a hinge lock mechanism of FIG. 17B in an engaged position from a side section view, according to one or more embodiments.

FIG. 18A illustrates an example of a hinge lock mechanism of FIG. 17A and FIG. 17B in a disengaged position (e.g., allowing opening of the hinge 1711) from a top section view, according to one or more embodiments. FIG. 18B illustrates the example of the hinge lock mechanism in a disengaged position from a side section view, according to one or more embodiments.

In one or more embodiments, it will be recognized that treatment may include pollination. For example, in one or more embodiments, the treatment surface 18 may be designed to collect and/or re-deposit pollen. In such case, the user may scan an identifier of a first plant, collect a pollen of the first plant, scan and identifier of a second plant, and deposit the pollen of the first plant at the second plant, with corresponding data logging the pollination of the second plant by the first plant. The treatment surface 18 may be disposable such that it can then be replaced for another pollination. As a result, the plant treatment device 10 may be able to assist in a controlled pollination routine and/or experiment, providing a rapid and accurate device, system, and/or method of pollination that can even be performed alongside other plant treatments.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

In addition, it will be appreciated that the various operations, processes, and methods disclosed herein may be embodied in a non-transitory machine-readable medium and/or a machine-accessible medium compatible with a data processing system (e.g., the plant treatment device 10, the plant treatment device 1300, the server 000). Accordingly, the specification and drawings are to be regarded in an illustrative rather than a restrictive sense.

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment (s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software, imaging programs, image data analysis software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example. Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java. Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the plant treatment device 10 according to the present invention will be apparent to those skilled in the art. Various aspects of the invention have been described above by way of illustration, and the specific embodiments disclosed are not intended to limit the invention to the particular forms disclosed. The particular implementation of the plant treatment device 10 may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A plant treatment device for cleaning a plant element, the plant treatment device comprising:
   a handle, the handle comprising a first arm and a second arm
      wherein the first arm and the second arm are joined at a first end, forming the handle;
   a first head rotatably coupled to the first arm at an opposite end to the first end through a first rotational element, the first head comprising a first surface of the first head and a second surface of the first head that at least one of (i) form a first treatment surface and a second treatment surface and (ii) receive and detachably couple to the first treatment surface and the second treatment surface,
   a second head rotatably coupled to the second arm through a second rotational element, the second head comprising a first surface of the second head and a second surface of the second head that at least one of (i) form a third treatment surface and a fourth treatment surface and (ii) receive and detachably couple to the third treatment surface and the fourth treatment surface,
   wherein the first head rotates about an axis parallel to the first arm such that at least one of the first surface of the first head and a second surface of the first head can face the second head,
   wherein the second head rotates about an axis parallel to the second arm such that at least one of the first surface of the second head and the second surface of the second head can face the first head, and
   wherein the first rotational element and the second rotational element each lock in at least two rotational positions such that one of the first treatment surface and the second treatment surface and one of the third treatment surface and the fourth treatment surface can face inward toward each other to gently grip and simultaneously wipe two opposite sides of the plant element.

2. The plant treatment device of claim 1, further comprising a double-sided cleaning sleeve comprising the first treatment surface and the second treatment surface.

3. The plant treatment device of claim 1, wherein the first arm and the second arm are connected via a spring mechanism on the first end, the spring mechanism tensioned to hold the first arm and the second arm open such that a user may bring two treatment surfaces together on the plant element by squeezing the first arm and the second arm of the handle.

4. The plant treatment device of claim 3, wherein the spring mechanism tensioned such that a hand of a user squeeze the handle to vary an amount of pressure applied to a plant element positioned between the first head and the second head.

5. The plant treatment device of claim 1, wherein the plant treatment device further comprises a pin that when engaged secures the first arm parallel to the second arm for compact storage of the plant treatment device.

6. The plant treatment device of claim 1, wherein the first arm and the second arm are extendible arms increasing a length of the plant treatment device relative to the handle to increase reach of the plant treatment device.

7. The plant treatment device of claim 1, wherein the first head rotationally locks at a second locking location that is 180° degrees from a first locking location.

8. The plant treatment device of claim 1, wherein at least one of the first arm, the second arm, the first head, and the second head are removable.

9. The plant treatment device of claim 1, wherein at least one of the first treatment surface, the second treatment surface, the third treatment surface, and the fourth treatment surface comprising an absorbent surface for receiving a liquid.

10. The plant treatment device of claim 1, wherein at least one of the first head and the second head are flat.

11. The plant treatment device of claim 1, wherein at least one of the first head and the second head comprising an elliptical cross section.

12. A device for wiping a plant element, comprising:
   a handle, the handle comprising a first arm and a second arm wherein the first arm and the second arm are joined at a first end to form the handle;
   a first head coupled to the first arm;
   a second head coupled to the second arm;
   a first head rotatably coupled to the first arm at an opposite end to the first end through a first rotational element, the first head comprising a first surface of the first head and a second surface of the first head that at least one of (i) form a first treatment surface and a second treatment surface and (ii) receive and detachably couple to the first treatment surface and the second treatment surface;

a second head rotatably coupled to the second arm through a second rotational element, the second head comprising a first surface of the second head and a second surface of the second head that at least one of (i) form a third treatment surface and a fourth treatment surface and (ii) receive and detachably couple to the third treatment surface and the fourth treatment surface, wherein the first head rotates such that at least one of the first surface of the first head and a second surface of the first head can face the second head, and wherein the second head rotates such that at least one of the first surface of the second head and the second surface of the second head can face the first head; and a locking mechanism holding the first arm and the second arm in a closed position in which the first arm and the second arm are parallel when the locking mechanism is engaged.

13. The device, according to claim 12, wherein at least one of the first arm and the second arm is coupled to an extendible arm.

14. The device, according to claim 12, wherein the first head rotationally locks at a second locking location that is 180° degrees from a first locking location.

15. The device of claim 12, wherein the first rotational element and the second rotational element each lock in at least two rotational positions such that one of the first treatment surface and the second treatment surface and one of the third treatment surface and the fourth treatment surface can face inward toward each other to gently grip and simultaneously wipe two opposite sides of the plant element.

16. The device of claim 12, wherein at least one of the first head and the second head is flat.

* * * * *